United States Patent [19]
Tomlinson et al.

[11] Patent Number: 4,961,206
[45] Date of Patent: Oct. 2, 1990

[54] DATA MODEM SYSTEM

[76] Inventors: Martin Tomlinson, The Coach House, Tristford House, Haberton, Totnes, Devon, England, TQ97RZ; Jonathan R. Bramwell, 27 Keaton Road, Ivybridge, Devon, England

[21] Appl. No.: 897,521
[22] PCT Filed: Nov. 22, 1985
[86] PCT No.: PCT/GB85/00539
§ 371 Date: Sep. 19, 1986
§ 102(e) Date: Sep. 19, 1986
[87] PCT Pub. No.: WO86/03356
PCT Pub. Date: Jun. 5, 1986

[30] Foreign Application Priority Data
Nov. 22, 1984 [GB] United Kingdom ............ 8429484
Mar. 8, 1985 [GB] United Kingdom ............ 8506065

[51] Int. Cl.⁵ ........................................... H04B 1/30
[52] U.S. Cl. .................................. 375/39; 375/82; 375/94; 375/97; 375/119
[58] Field of Search .............. 375/39, 45, 52, 80, 375/82, 97, 103, 118, 94, 119; 329/50, 104, 145, 304, 306, 310, 323, 327; 328/155; 455/303, 304, 313

[56] References Cited
U.S. PATENT DOCUMENTS

| | | | |
|---|---|---|---|
| 3,688,196 | 8/1972 | Doelz | 375/39 |
| 3,971,996 | 7/1976 | Motley et al. | 375/118 |
| 4,027,250 | 5/1977 | Lang | 375/118 |
| 4,084,137 | 4/1978 | Welti | 375/39 |
| 4,253,067 | 2/1981 | Caples et al. | 455/214 |
| 4,633,485 | 12/1986 | Betts et al. | 375/103 |
| 4,652,834 | 3/1987 | McAdam | 375/94 |

*Primary Examiner*—Benedict V. Safourek
*Attorney, Agent, or Firm*—Hale and Dorr

[57] ABSTRACT

A data modem system incorporates, digital filters in transmitter and receiver units having intermediate frequency stages which operate at a frequency which is an integral multiple of the modulation symbol rate. This enables filtering, modulation and demodulation to be carried out in a relatively simple manner using digital hardware, with conversion between different forms of modulation such as QPSK, BPSK and offset BPSK being possible without substantial hardware modifications. In one embodiment of the invention, the receiver employs a phase estimating circuit to compensate for phase and frequency errors arising when a free-running local oscillator is used as an alternative to one controlled via a phase-locked loop.

31 Claims, 15 Drawing Sheets

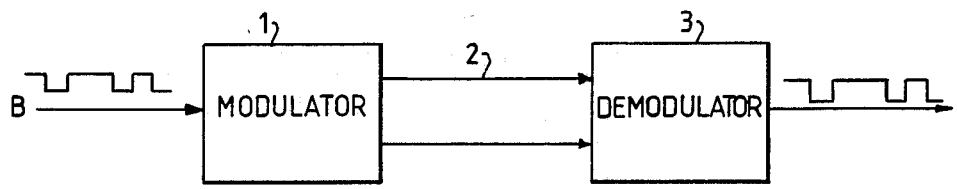
FIG.1.
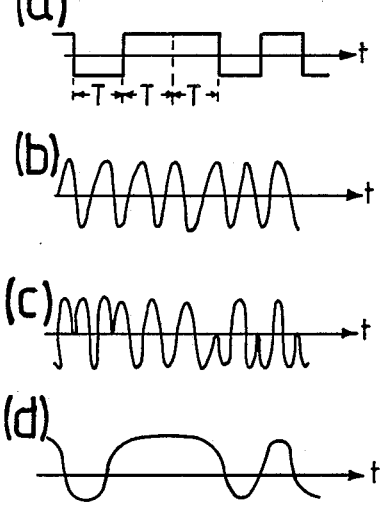
FIG.2.
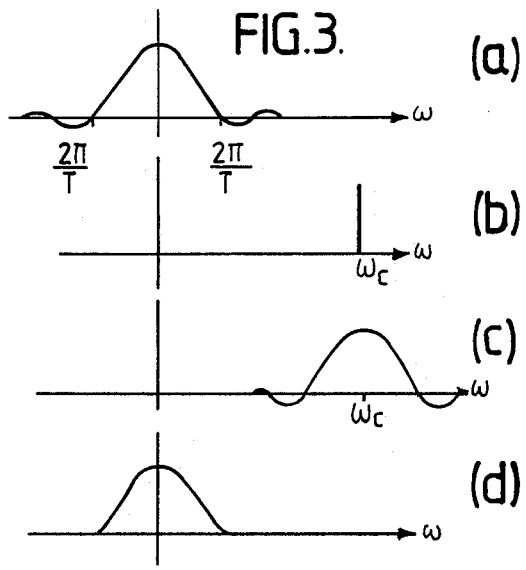
FIG.3.
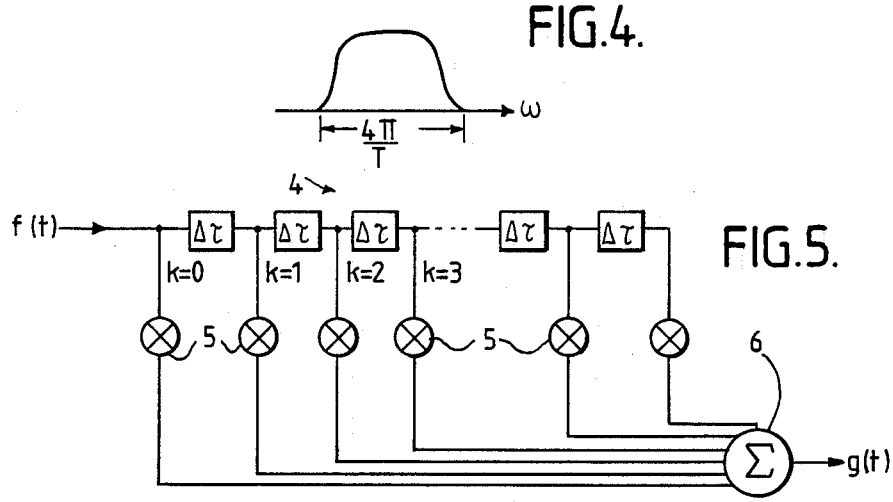
FIG.4.
FIG.5.

| | MSB's OF DIGITAL FILTER OUTPUTS (FILTER 59 OUTPUT GIVEN FIRST) | | | |
|---|---|---|---|---|
| | '00' | '01' | '10' | '11' |
| $\psi = 0°$ | 00 | 01 | 10 | 11 |
| $\psi = 90°$ | 10 | 00 | 11 | 01 |
| $\psi = 180°$ | 11 | 10 | 01 | 00 |
| $\psi = 270°$ | 01 | 11 | 00 | 10 |

SUBSTREAM BIT VALUES (B1,B2)

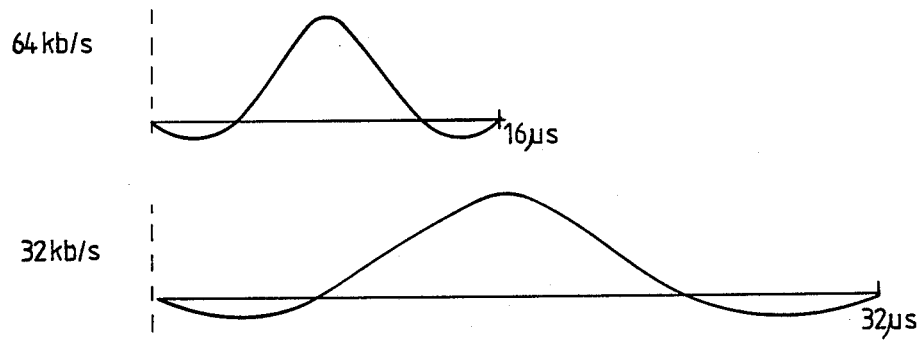
FIG. 21.
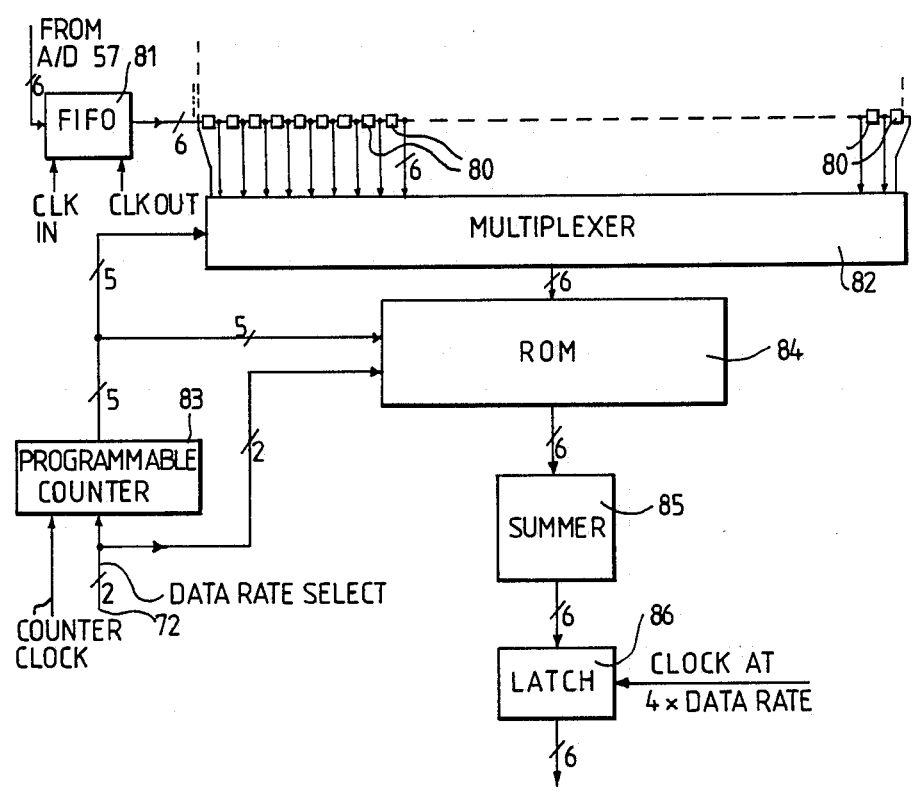

DATA MODEM SYSTEM

The present invention relates to data modems, and primarily to modems containing digital filters.

The transmission of digital (typically binary) signals over a communications channel, such as a satellite link, generally involves modulating the digital signal onto a carrier and subsequently effecting a demodulation process to recover the original signal FIG. 1 of the accompanying drawings illustrates this process in block schematic form with the modulator block being referenced 1, the communications channel 2, and the demodulator block 3. Typical time-domain and frequency-domain signal representations for this process are shown in FIGS. 2 and 3 respectively.

Considering first the form of binary signal to be transmitted over the communications channel 2, FIG. 2a shows the time-domain representation of a random binary stream of period T; FIG. 3a shows the frequency spectrum of the binary stream. For a simple frequency-shifting modulation process such as amplitude modulation, the binary stream B is multiplied with a carrier waveform of frequency $\omega_c$ (represented in FIG. 3b), the logic "1" value of the binary signal producing a modulator output of $+A \cos \omega_{ct}$ (where A is a constant) and the logic "0" value of the binary stream producing a modulation output of $-A \cos \omega_{ct}$. This form of binary amplitude modulation can also be viewed as binary phase shift keying of the carrier as the latter is keyed between phase states of O and II radians. FIGS. 2c and 3c show the time and frequency domain representations of the modulator output. Suitably implemented, the demodulator serves to recover the original signal (FIGS. 2a, 3a) free of distortion. A major drawback with the simple data modem described above is the excessive bandwidth occupied by the transmitted signal (see FIG. 3c). In order to reduce the system bandwidth and thus allow several channels, with different center frequencies, to occupy the space previously taken by one, it is known to shape the spectrum of the transmitted signal by means of filters. This shaping may be effected either on the unmodulated or modulated signal. Typically, these filters have a frequency response of the form illustrated in FIG. 4 whereby, for a signal of the form of FIG. 2a input into the modem of FIG. 1, the signal at the demodulator output will have the time-domain form illustrated in FIG. 2d and a spectral shape as shown in FIG. 3d. It will be seen from these latter Figures that the occupied signal bandwidth has been substantially limited at the cost of some distortion of the received signal; however, by evaluating the received signal at its period midpoints, it is normally possible to recover the transmitted data virtually error-free.

It can be shown that for optimum system performance, the desired spectral shaping introduced by the modem filters should be equally split between the modulator and the demodulator.

One way of providing filters with the desired spectral shaping characteristics is to calculate the corresponding required filter impulse response and then to construct a filter, known as a transversal filter, which generates the filter output signal as an approximate convolution integral of the input signal with the calculated impulse response. More particularly, for an input signal f(t) and a filter impulse response of h(t), it is known that the filter output g(t) is given by:

$$g(t) = f(t) * h(t) \quad (1)$$

where * represents the convolution integral. This may be re-written as:

$$g(t) = \int_0^t f(t - \tau) h(\tau) d\tau \quad (2)$$

where $\tau$ is the delay variable of the convolution integral. The foregoing can be approximated by $$g(t) = \sum_{k=0}^{t/\Delta\tau} f(t - k\Delta\tau) \int_{(k - \frac{1}{2})\Delta\tau}^{(k + \frac{1}{2})\Delta\tau} h(\tau) d\tau \quad (3)$$

where k is an integer.

This approximation can be seen to be taking samples of the input signal f(t) at delays $k\Delta\tau$, multiplying them by the area under the corresponding portion of the impulse response and summating the resultant values ($h(\tau)$ being, of course zero for negative values of $\tau$). The integral on the right-hand side of Equation (3) is frequently approximated to $h(k\Delta\tau)d\tau$.

A physical realization of this convolution approximation is illustrated in diagrammatic form in FIG. 5 where the input signal f(t) is fed to a delay line 4 with taps at $k\Delta\tau$, the output of each tap is multiplied in a multiplier 5 by the preset weight $h(k\Delta\tau)\Delta r$ (or its integral form) determined by the required filter response, and the weighted tap outputs are summed in a summer 6 to give the filter output g(t).

The overall delay length of the delay line 4 is determined by the time width over which the desired filter impulse response h(t) has significant values while the value of $\Delta\tau$ and thus the number of taps determines the accuracy of the approximation represented by Equation (3).

In this latter respect, it may be noted that if f(t) is a digital signal of period T equal to any integer multiple, including unity, of $\Delta\tau$, then Equation (3) ceases to be an approximation and is equivalent to Equation (2) for $t = n\Delta\tau$ where n is an integer.

Various implementations of transversal filters are known including the use of charge-coupled devices, surface acoustic wave devices and digital computers. In the latter case, the desired impulse response is typically stored and then referenced to effect each weighting operation as required. Digital implementations of transversal filters are usually referred to as digital filters. A general description of transversal filters may be found in ∓Introduction to Communication Systems" by Ferrel G. Stremler published 1982, Addison Wesley.

It is an object of the present invention to provide a low cost data modem system using digital filter devices.

According to one aspect of the present invention, there is provided apparatus for transmitting a modulated signal in which a digital modulation signal is filtered prior to transmission on a carrier, characterised by a digital filter arrangement comprising delay means for receiving a binary modulation signal, memory means having a plurality of addressable locations each arranged to output, when addressed, a digital value determined by the required filter response and the input modulation signal history, and addressing means arranged to use digital value history values produced by the delay means for addressing the memory means. Preferably the digital values stored in the memory means are pre-weighted by sample values of a carrier waveform having a carrier frequency which is an integral multiple of the modulation symbol rate so as to permit simple digital up-conversion of the modulation signal to produce, for example, a QPSK or BPSK modulated carrier. The values stored in the memory means may be regarded as representing a plurality of values g(t) each equal to a summation $$\sum_{i=o}^{i} (z_i \cdot a_i)$$

where $z_i$ is an input signal value and $a_i$ is a coefficient derived from a required filter impulse response.

The frequency or clocking rate of the filter output (that is, the number of times the value of g(t) is determined every second) is controlled by the clocking rate of the addressing means which may be independent of the value $\Delta\tau$ introducing by individual delay elements of the delay means.

The delay means of the filer may be analog or digital in form though in the former case this will require the provision of analog-to-digital converter means to convert delay line tap signals into a form usable by the addressing means. Where digital delay means are used then, again, an analog-to-digital converter will be required if the filter input signal is analog in form. Sampling of analog signals should, of course, generally be at or above the Nyquist frequency if aliasing problems are to be avoided. Similarly, the output clocking rate of the filter should be sufficiently high to avoid aliasing problems; for digital signals fed to the filter, the output clocking rate is preferably four times the data rate while for analog signals the output rate should be at least equal to the Nyquist frequency.

Similar techniques can be used in a data modem receiver. The invention provides, according to a second aspect thereof, apparatus for receiving an information carrying modulated data signal having a predetermined modulation symbol rate, characterized by means for converting the said signal to a modulated carrier signal having a carrier frequency which is an integral multiple of the symbol rate, means for splitting the carrier signal into quadrature components, and digital filter means coupled to the splitting means and arranged to produce a plurality of digital sample values representative of a demodulated informational signal.

According to a third aspect of the invention, a data modem system having a transmitter unit and a receiver unit for transmitting and receiving digital information represented by a binary modulation signal of a predetermined symbol rate is characterised in that at least one of the units includes an intermediate frequency stage operable at a frequency which is an integral multiple of the modulation signal symbol rate.

The invention also includes related methods of transmitting and receiving as claimed in claims 10 and 13.

Referring now to the digital filter means that may be used in a data modem system in accordance with the invention, in a first class of filter means each location of the memory means stores a digital value representing the right-hand side of Equation (3) (or its non-integral approximation) in its entirety, that is, the value of the filter output signal g(t) appropriate to the current input signal history. This value is, of course, determined by the state of the input signal f(t) over a preceding period equal to the time width of the significant portions of the desired filter impulse response h(t), this also being the total delay of the delay means. The current input signal history is characterised by the digital signal values at the tap points and these digital values are used in addressing the appropriate memory location for each clock period $\Delta\tau$ of the filter output. In these embodiments, the clocking rate of the addressing means equals that of the filter output.

In a second class of filter means of the present invention, each location of the memory means stores a digital value representing a component:

$$f(t - k\Delta\tau) \int_{(k - \frac{1}{2})\Delta\tau}^{(k + \frac{1}{2})\Delta\tau} h(\tau)d\tau \text{ or } f(t - k\Delta\tau) h(k\Delta\tau)\Delta\tau$$

of the filter output signal, each component being appropriate to a particular input signal value at a particular period of the input signal history. During each clocking period of the filter output, the addressing means takes the digital value of each tap point in turn to address each of the memory locations holding a component appropriate to the current input signal history, these components being subsequently added together in a summer of the digital filter to form the filter output. In general, each newly calculated output value produced by the summer will be fed to a latch to serve as the actual filter output during the next output clock period while the summer calculates the next output value. In these embodiments, the clocking rate of the addressing means will preferably be a multiple of that of the filter output by a factor equal to the number of taps along the delay means. In fact, rather than processing each tap output in turn, it would be possible to process the tap outputs in parallel though this would of course require multiplication of the addressing and memory means; the main advantage of parallel processing would be in speed of operation.

The implementation of a digital filter using addressed memory means in accordance with the invention avoids the need for weighting computations and, in the case of embodiments of the first class referred to above, also avoids the need to summate the weighted tap components to form the filter output.

The first class of filter means while being simpler in form require much larger memory sizes than those of the second class since in the former case all possible input signal histories over the impulse response period must have corresponding output values stored in the memory whereas in the latter case, it is only necessary to store a set of output-signal component values for each value of k, each value in a set corresponding to a particular input signal value at the delay $k\Delta\tau$. The first class of embodiments are thus most suited to cases where the filter input signal is binary in form and the maximum value of k is small; the second class of embodiments is more suited for analog input signals represented in the filter by, for example, 6 to 8 bit binary samples. For this reason, the first class of embodiments is more suited to the transmitter-portion of a data modem while the second class is more suitable to the receiving portion.

In preferred embodiments (of either said first or said second class) the delay means comprises a digital delay line made up of a plurality of shift register cells (possibly multi-bit) connected in series and clocked at a rate $R_1$ equal to $1\Delta\tau$, the tap points of the line being the outputs of the individual cells. Assuming that the input signal to the digital delay line has a basic period T corresponding to a rate $R_2$ (the signal either being a digital signal of period T input to the filter or an analog signal sampled in the filter at a rate $R_2$), then the clocking rate $R_1$ of the digital delay line is, advantageously, equal to an integer multiple N (including unity) of the input-signal rate $R_2$ or, in other words, $\Delta\tau = T/N$. Clearly, for a given value of T, the greater the value of N, the less the value of $\Delta\tau$ and the greater the number of tap points along the delay line which of course leads to an increase in the accuracy of the convolution approximation effected by the digital filter. The penalty for having N large is the very large size of the memory means then required.

As the input signal is clocked down the delay line at rate $R_1$, the output of the taps taken overall, will change at a corresponding rate. Prima facie this would appear to set a limit on the rate of evaluating the filter output g(t) since evaluation at a faster rate would simply mean re-evaluating, in the same manner, information already used. Accordingly, the clocking rate $R_3$ of the addressing means should prima facie be such as to set the clocking rate $R_4$ of the filter output equal to $R_1$. In fact, while for strict compliance with Equation (3) the maximum rate of evaluation of g(t) does correspond to $R_1$, it is feasible to calculate approximate intermediate values of g(t) between successive points in time "$t_x$" and "$t_x + \Delta\tau$" where each of these latter points corresponds to a clocking of the delay line and evaluation of g(t) based on application of Equation (3) to the outputs of the taps. The calculation of these intermediate values of g(t) involves revaluation of Equation (3) with the same values of $f(t - k\Delta\tau)$ as at time $t_x$ but with the limits of the integral $\int h(\tau)d\tau$ shifted by an amount equal to the displacement of the intermediate value from the point $t_x$; thus where three intermediate values are required between $t_x$ and $t_x + \Delta\tau$, the limits of the integral are shifted by an amount $$+\frac{\Delta\tau}{4}, +\frac{2\Delta\tau}{4}, \text{ and } +\frac{3\Delta\tau}{4}$$

in calculating the filter output. These intermediate values are, however, inferior approximations since the values of f(t) after $t = t_x$ are not taken into account, being treated as zero; in practice this is acceptable as these values, after weighting, would be small.

In embodiments of the invention (using either class of filter) where the aforesaid intermediate values are used, the addressing means not only uses the tap output values to address the memory means but it also utilises a cyclic counter that provides an indication of which value is next to be addressed, that is for example, the value for $$t_x, t_x + \frac{\Delta\tau}{4}, t_x + \frac{2\Delta\tau}{4}, \text{ or } t_x + \frac{3\Delta\tau}{4},$$

where three intermediate values are provided.

The advantage of using intermediate values as discussed above will be seen from the following example. For a binary input signal of period T, it is desired to obtain 4 output samples per period. This could be achieved by setting N=4 so that $\Delta\tau = T/4$ and then outputting one value of g(t) for each clocking of the delay line. If the significant time width of the impulse response h(t) was, for example, 8T then there would be 32 taps which, for embodiments of the first class would require $2^{32}$ memory locations or, for embodiments of the second class, $2^8$ memory locations. Now, if instead $\Delta\tau$ is made equal to T (giving 8 taps) and intermediate values are used, then for embodiments of the first class, the required memory capacity is $2^{10}$ locations while for embodiments of the second class, the required capacity is $2^6$ locations. Thus for a given output rate, the use of intermediate values is highly advantageously in reducing memory capacity requirements (though it should be noted that the accuracy of the output values is less than where extra taps are used to give the necessary output rate).

The use of intermediate values is, of course, also possible where an analog delay line is employed together with analog-to-digital converter means to convert the tap outputs to digital form.

In contrast to the immediately preceding discussion regarding the provision of intermediate values between clockings of the delay line, in certain circumstances not only may the use of intermediate values not be required, but it may not even by required to provide an output corresponding to the tap point signals after each and every clocking of the delay line (or sampling of the tap points of an analog delay). Such circumstances may arise where the filter output values must be accurately determined, (requiring a small value of $\Delta\tau$ and thus a high delay-line clocking rate $R_1$) but these output values are only required at a rate less than $R_1$. One particular example where this may apply is where an analog input waveform has been sampled at the Nyquist rate which is also used as the clocking rate $R_1$ of the delay line. In order to avoid aliasing effects in the filter output, all relevant samples of the analog signal must be used in determining the appropriate filter output. However, where the filter's response is such as to restrict the signal band width in a manner reducing the applicable Nyquist rate at the filter output, then the clocking rate of the filter output can be made less than that of the delay line without introducing aliasing problems. This, of course, implies that not every new combination of the tap point values is utilised to determine an output value and that an output value may need to be held after the corresponding tap values have disappeared.

For the aforesaid first class of digital filter means, this can be readily achieved either by appropriately latching the outputs of the tap points or the output of the memory means at the required filter output rate.

For the second class of embodiments where the filter output is evaluated by summing a plurality of components each determined by the output of a corresponding tap point, the output latch of the filter could also be latched at the required output rate with the operation of the summer being occasionally ignored. This approach does, however, miss out on the opportunity to utilise the time fruitlessly spent in calculating unwanted output values, to extend beyond one clocking period of the delay line the time spent in calculating the output values that are used; operation of the filter in this manner would enable the filter to be run at higher input data rates than otherwise possible. One possible arrangement for effecting filter operation in this manner comprises a FIFO shift store (First In First Out) disposed in front of the delay line and clocked jointly with the delay line. This clocking is no longer evenly effected but is carried out at minimum intervals where no output values are to be calculated from the resultant tap output combinations and at extended intervals where output values are to be calculated from the current tap outputs. Thus, for example, where only one output value is to be calculated for every four input samples, then when a new output value is due the next four input samples held in the FIFO are rapidly clocked into the delay line and thereafter clocking is ceased for the whole of the filter output clock period while the next output value is calculated from the tap point values, the last preceding calculated value being held in an output latch and constituting the filter output. At the end of the output clock period, the newly calculated value is input into the output latch and four new input sample values are rapidly clocked into the delay line.

Preferably, the FIFO and the filter clocking circuitry are arranged to cope with various different ratios between the input and output clocking rates. In certain data modems in accordance with the invention, the filters may be required to deal with data signals of various different data rates.

Generally in these circumstances the filters will be required to effect the same general spectral shaping but referred to the data rate concerned. The way in which modems embodying the invention are arranged to deal with this requirement will usually depend on whether the input signal to the filter delay line is a binary data stream (as would be the case in the transmitting half of a data modem) or multi-bit samples of an analog waveform (as would be the case in the receiving half of a modem). In the former case, the values stored in the memory means for effecting spectral shaping at one data rate can also be used to effect shaping at the other date rates simply by changing all the clocking frequencies appropriately. This does, however, have the drawback that aliased outputs would reduce in frequency with reducing data rates so that while circuitry subsequent to the digital filter can be designed to cut out the aliases of the higher data rates, the aliases of the lower rates would, if not otherwise prevented, be passed on. This can be overcome by providing at the digital filter output a bank of low pass filters for blocking the aliases, the low pass filter appropriate to the data rate selected being switched in series with the digital filter output. As an alternative to the foregoing arrangement of changing all the clock frequencies and providing anti-aliasing filters, the output clocking rate of the digital filter can be kept constant for all data rates (which would enable the subsequent circuitry to be designed to remove all aliases) and one of the following arrangements adopted:

(a) the incoming signal could be clocked into the delay line at a constant rate (for example, at the highest data rate) and the length of the delay line extended to the full significant time width of the desired impulse response as applied to the lowest data rate; in this case the taps selected for use would depend on the data rate with the first k taps being used at the highest rate and k taps evenly spaced along the line at the lowest rate.

(b) the incoming signal could be clocked into the delay line at its own data rate and each data rate would have an associated set of stored values in the filter's memory, each set including an appropriate number of intermediate values to fill out the filter output (thus if at the highest data rate four values are output by the filter during each period of the incoming signal, then for an incoming signal at a quarter the highest data rate, sixteen values are stored and output during each period of the incoming signal.

This latter arrangement is preferred and can be used with both said first and second class of filters.

Considering next the situation referred to above where it is desired to implement a variable data-rate filter when the latter is fed with multi-bit signal samples, it will be assumed that the sampling has been carried our at or above the Nyquist rate for the highest data rate to be handled and that this sampling rate cannot be reduced with reductions in the data rate of the signal. This situation may arise where the signal concerned is the output of the initial receiving stages of a modem, as the signal will generally have been band-limited to a band having a width set by the highest data rate (typically four times the latter); in such situations, if the sampling rate were simply reduced for the lower data rates, this would result in the aliasing back into the signal band of noise components not cut out by the band limiting.

One way of providing the desired variable data-rate filter is to clock the incoming signal samples into the filter delay line at the sampling rate with the delay line having a length equal to the full significant time width of the desired impulse response as applied to the lowest data rate. The number of delay line taps required to be used is dependent on the data rate since the time width of the corresponding impulse response is inversely proportional to the data rate. Note that in order to avoid aliasing problems, all relevant input samples must be used so that it is not possible simply to vary the spacing of a constant number of taps along the delay line in dependence on the data rate. Due to the differing number of taps used for the different data rates, the ROM is required to store a set of output values (or components thereof) for each data rate. With all the relevant input samples involved in calculating each filter output sample, the problem of aliasing back noise is avoided and the sample-output rate can be dropped to that appropriate for the data rate involved. As previously explained, it is in fact possible to avoid the need to calculate the output samples that are to be discarded, the corresponding processing time being reallocated, by use of an input FIFO store, to the calculation of the desired output sample. A filter of this form can be of either the said first or second class of embodiments, though, for the reasons already discussed, the second class are more suitable when multi-bit samples are involved.

In fact, the form of filter described in the last preceding paragraph requires complex hardware for its implementation. In order to simplify this hardware to a degree, the filter can be implemented in two stages, namely a variable-bandwidth filter stage which can be matched to the signal data rate whereby to cut out noise components outside the signal bandwidth, and a spectral-shaping filter stage to which the samples output by the variable-bandwidth filter are fed at a rate related to the signal data rate. The form of the variable-bandwidth filter stage is similar that to that described in the last preceding paragraph, the simplification involved being that the impulse response modelled by the filter requires a shorter delay line due to the less severe filtering being effected. The main spectral-shaping filter stage is also of simpler form since the input clocking rate is directly related to the signal data rate so that the same number of delay line cells, and the same set of stored output values (or components thereof) can be used for all data rates.

In a modulator, the modulating process is effected in the filter itself by weighting the values stored in the memory means by sample values of a carrier frequency $\omega_c$. In this case, the frequency of the carrier is preferably chosen such that the filter output clocking rate is an integer multiple of the carrier frequency. Generally, of course, the values stored in the filter's memory means are not accessed in any predetermined order but in an order determined by the current input signal history; as a result each output value to be weighted by a carrier sample value and stored will generally require to be stored with several different carrier signal sample weights, the addressing means being arranged to access the value appropriately weighted for the carrier sample next in turn. In fact, where several output values are produced from the same input signal history as is the case where the aforesaid intermediate values are stored, then since these values are accessed in a predetermined sequence, it is possible to assign a single carrier sample weighting to each stored value.

Advantageously, four sample values of a carrier sin $\Omega_c t$ are taken at angles 0, $\pi/2, \pi$ and $3\pi/2$ giving sample weightings of 0, +1, 0 and −1; however, rather than waste memory space storing zero values, the (+1) and (−1) weight samples output by the filter can be multiplexed with a zero signal stream, (in this case, the carrier frequency will be half the output clocking rate while the multiplexing frequency will be double the output rate). In fact, where the modulator forms part of a quadrature modulation system in which two data channels are modulated onto sin and cos carriers respectively and then combined, the stream multiplexed with the sin-weight filter output, instead of being a zero stream, may advantageously be constituted by the output of a cos-weight filter in the second data channel whereby the multiplexing constitute additive mixing of the two modulated channel signals.

Where the carrier signal sample weightings are (+1) and (−1), then as an alternative to weighting the values stored in the memory means, the output of the memory means (or, for the said second class of embodiments, the output of the summer) can be fed to a digital inverter arranged to invert (that is, turn into its negative representation) every other filter output value (assuming that '0' values are not output).

A similar process to that described above for carrier modulation can be effected in accordance with the invention in filters operating in demodulators, the weighting of the values stored in the memory means of the filter serving in this case to reverse the process effected in the modulator.

Various other novel aspects and features of the invention will become apparent from the following description, given with reference to FIG. 6 onwards of the accompanying diagrammatic drawings, of a data modem that includes digital filters in its modulator and demodulator blocks, it being understood that this description is given by way of example and is not to be construed as limiting the scope of the present invention.

In the drawings (of which FIGS. 1 to 5 have already been referred to)

FIG. 1 is a block schematic diagram of a prior art data modem;

FIG. 2 shows time domain representations of typical signals present during operation of the FIG. 1 modem;

FIG. 3 shows frequency domain representation of the signals shown in FIG. 2;

FIG. 4 shows the frequency response of a typical spectrum-shaping filter suitable for use with the FIG. 1 modem;

FIG. 5 is a generalized block diagram of a typical transversal filter;

FIGS. 21 and 22 are block diagrams respectively of first and second stages of the digital filters included in the FIG. 17 demodulator;

The data modem now to be described with reference to FIGS. 6 to 19 of the accompanying drawings are intended for use in a satellite communications link. They operate on the Principle of quadrature multiplexing in which two amplitude modulated signals are combined in phase quadrature. Such a modulation process is generally referred to as QAM, that is, Quadrature Amplitude Modulation.

Figure 6:
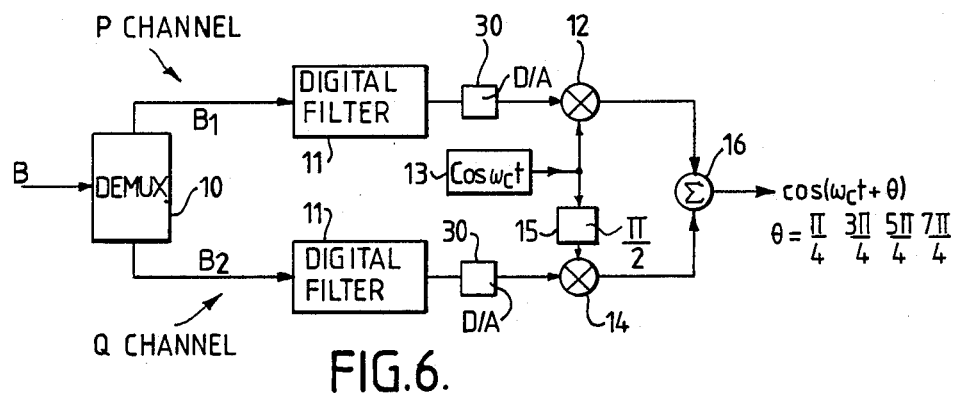
FIG. 6 is a block diagram of one form of data-modem modulator block including digital filters.

The modulator block of a modem is shown in FIG. 6 and, as can be seen, includes an input demultiplexer 10 arranged to receive an incoming binary data stream B and to divide this stream into two sub-streams $B_1$ and $B_2$ for further processing in separate, but virtually identical, channels hereinafter referred to as the P and Q channels. It will be appreciated that the data rate of the $B_1$, $B_2$ streams is half that of the input stream B; by way of example, the stream B will be hereinafter taken as having a maximum data rate of 512 kilobits/second (kb/s) and selectable lower rates of 256, 128, 64 kb/s. Furthermore, for ease of explanation, the binary data streams will be considered to be in the "non return to zero" (NRZ) format and to be random in nature.

Disregarding for the moment the presence of the digital filters 11 in the P and Q channels, the substreams $B_1$, $B_2$ are individually modulated onto a carrier of frequency $\omega_c$ using double sideband, suppressed carrier (DSB-SC) modulation, the P channel signal being modulated in a multiplier 12 onto an in-phase carrier signal $\cos \omega_c t$ generated by an oscillator 13 and the Q channel signal being modulated in a multiplier 14 onto a quadrature carrier signal $\sin \omega_c t$ produced from the $\cos \omega_c t$ using a $\pi/2$ phase shifter 15.

The modulation process is such that a binary "1" in the $B_1$ stream produces a signal $+A \cos \omega_c t$ at the output of the multiplier 12 while a binary "0" produces a signal $-A \cos \omega_c t$; similarly a binary "1" in the $B_2$ stream produces a signal $+A \sin \omega_c t$ at the output of the multiplier 14 while a binary "0" produces a signal $-A \sin \omega_c t$.

The outputs of the multipliers 12 and 14 are then added in a summer 16 to form the modulator output.

The above described form of QAM modulator may also be considered a quaternary phase shift keyed (QPSK) modulator since as a result of all the signals output by the multipliers 12, 14 having the same amplitude A, the signal output from the summer 16 while having a constant amplitude will have one of four possible phase states. This can be readily seen by reference to the phasor diagram of FIG. 7 which shows the four possible outputs $\pm A \cos \omega_c t$, $\pm A \sin \omega_c t$ of the multipliers 12, 14, and the resultant four possible outputs from the modulator (that is, the summer 16), these resultant outputs (shown dashed) having phases $\theta$ of $$\frac{\pi}{4}, \frac{3\pi}{4}, \frac{5\pi}{4} \text{ and } \frac{7\pi}{4}$$

relative to the reference phase established by the basic carrier signal $\cos \omega_c t$; the summer output may thus be represented as $\cos(\omega_c t + \theta)$.

Figure 7:
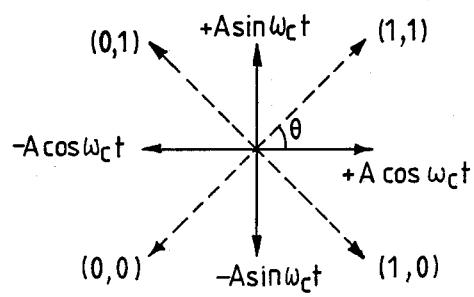
FIG. 7 is a phasor diagram illustrating the general form of the output of the FIG. 6 modulator block.

Assuming that the binary streams $B_1$ and $B_2$ are phase, the modulator output will change between its possible phase states once every period of the streams $B_1$, $B_2$, the output of the modulator during each period being considered as a symbol transmitting two bits of the original binary stream B (these bits being shown in brackets next to the relevant output phasors in FIG. 7 the bit passed to the P channel being given first).

The spectrum of the modulator output is the same as that of each of the two channel signals fed to the summer 16 and will have the "sin over argument" form similar to that illustrated in FIG. 3(c). In order to restrict the bandwidth occupied by the modulated signal, filters 11 are provided in the P and Q channels to shape the spectrum of the binary substreams $B_1$, $B_2$ prior to modulation. These filters 11 which will be described in detail hereinafter modify the time and frequency domain representations of the streams $B_1$, $B_2$ in a manner similar to that described and illustrated with reference to FIGS. 2d and 3d (though these representations strictly apply to analog filters whereas the filters 11 are digital). The "rounding off" of the $B_1$, $B_2$ pulse waveforms by the filters 11 has the effect of causing the phase transitions in the modulator output to be progressive between the four main phase states rather than of stepwise form (though at the mid-point of each symbol, the phase $\theta$ should be equal to one of the four main values $$\frac{\pi}{4}, \frac{3\pi}{4}, \frac{5\pi}{4}, \text{ and } \frac{7\pi}{4})$$

However, at the same time, the envelope of the modulator output now also varies which can under certain circumstances be a disadvantage. The modulator output spectrum will be similar in form to that of FIG. 3(d) but shifted to the carrier frequency $\omega_c$.

Figure 8:
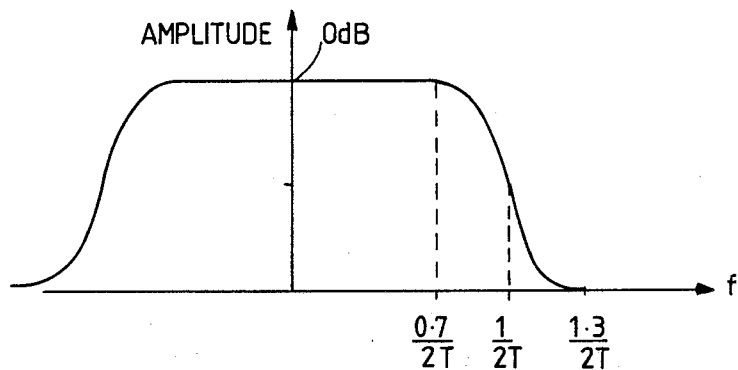
FIG. 8 shows the frequency response of an ideal 30% raised cosine filter.

In the modulator of FIG. 6, it is desired to effect an overall 30% raised cosine spectral shaping in the modulator-demodulator link; FIG. 8 illustrates the frequency response of a filter for effecting such shaping. In FIG. 8, T represents the period of the data stream being shaped from which it will be appreciated that the filter desired characteristics are dependent on the data rate of the stream.

In fact, in order to obtain optimum performance, the spectral shaping is equally split between the modulator and demodulator with each effecting a $\sqrt{30\%}$ raised cosine shaping. It is this $\sqrt{30\%}$ shaping that the digital filters 11 are designed to effect in each of the P and Q channels.

Figure 9:
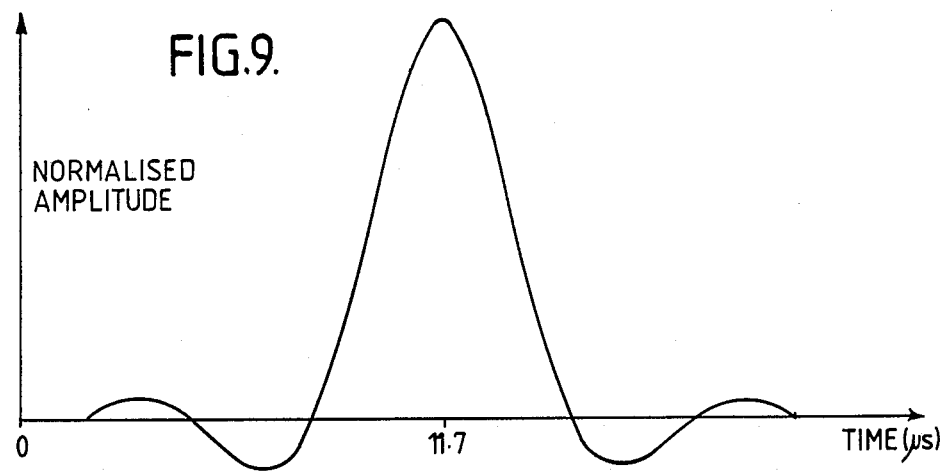
FIG. 9 shows the impulse response of a $\sqrt{30\%}$ raised cosine filter for a data rate of 256 kb/s.

As already noted hereinbefore, transversal filters, including digital filters, operate by determining an approximate value for the convolution integral of the input signal with the desired impulse response of the filter. This impulse response can be readily derived from the desired frequency response since the latter is the Fourier transform of the former. FIG. 9 shows the desired impulse response for each digital filter 11 for a data rate of the streams $B_1$, $B_2$ of 256 kb/s; for lower data rates, the impulse response would be proportionately extended along the time axis.

Figure 10:
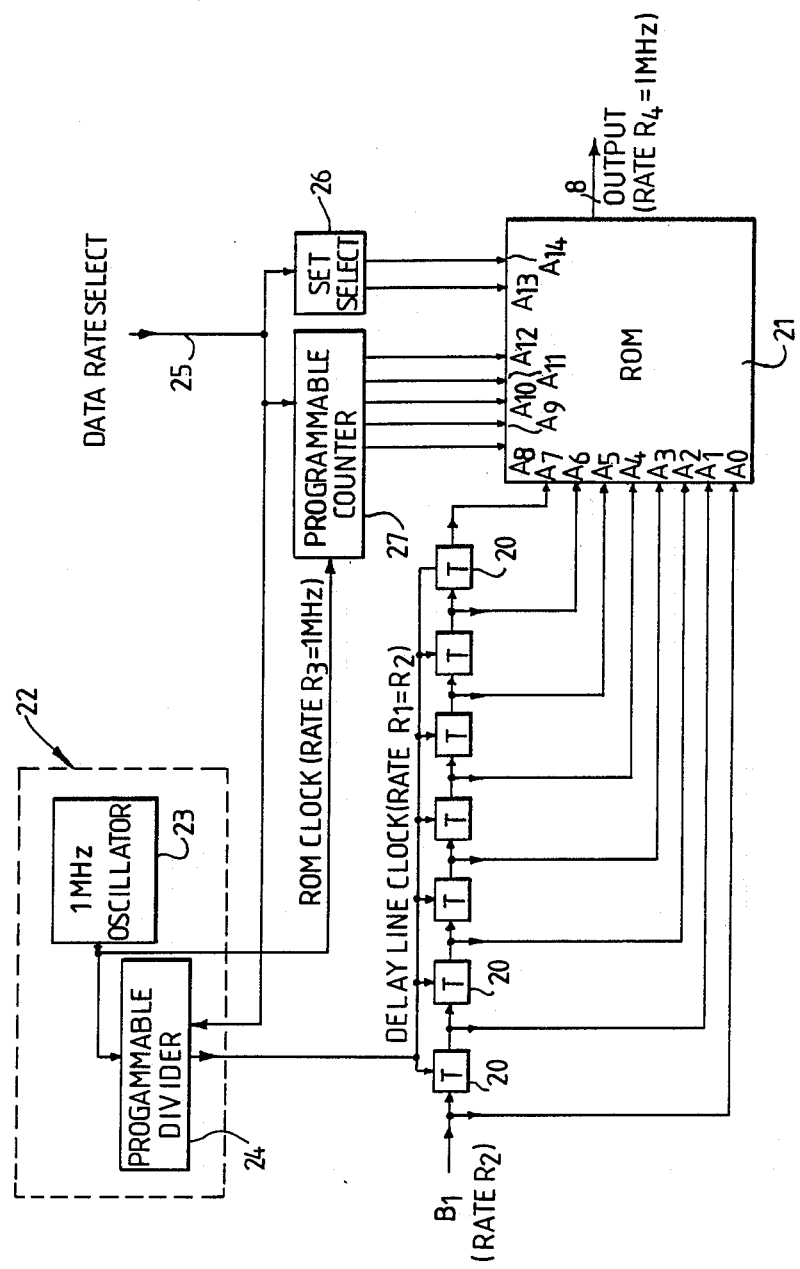
FIG. 10 is a block diagram of a digital filter forming part of the FIG. 6 modulator.

FIG. 10 shows the P-channel digital filter 11 in block diagram form, the Q-channel filter 11 being identical. The P-channel filter 11 basically comprises a digital delay line composed of seven serially interconnected 1-bit shift-register cells 20 fed at one end with the binary sub-stream $B_1$, and an output-value ROM (Read Only Memory) 21 addressed by the outputs of the cells 20. In the present filter, the delay-line cells are clocked at a rate $R_1$ equal to the data rate $R_2$ of the stream $B_1$.

The filter 11 operates on the principle that the value of the 8-bit binary word constituted by the filter input and the outputs of the cells 20 represents the current history of the filter input f(t), constituted by the stream $B_1$, over the period relevant to determining the current filter output g(t), that is, over a period equal to the significant time width of the filter's desired impulse response; in the present example, this time width is taken as being 7T where T is the period of the stream $B_1$. The binary word constituted by the outputs of the cells 20 is used as an address code on address lines $A_0$–$A_7$ to look up in the ROM 21 the filter output (an 8-bit word) appropriate to the current relevant signal history, the ROM storing output values appropriate to all possible values of the addressing binary word (that is, appropriate to all possible input signal histories).

Figure 11:
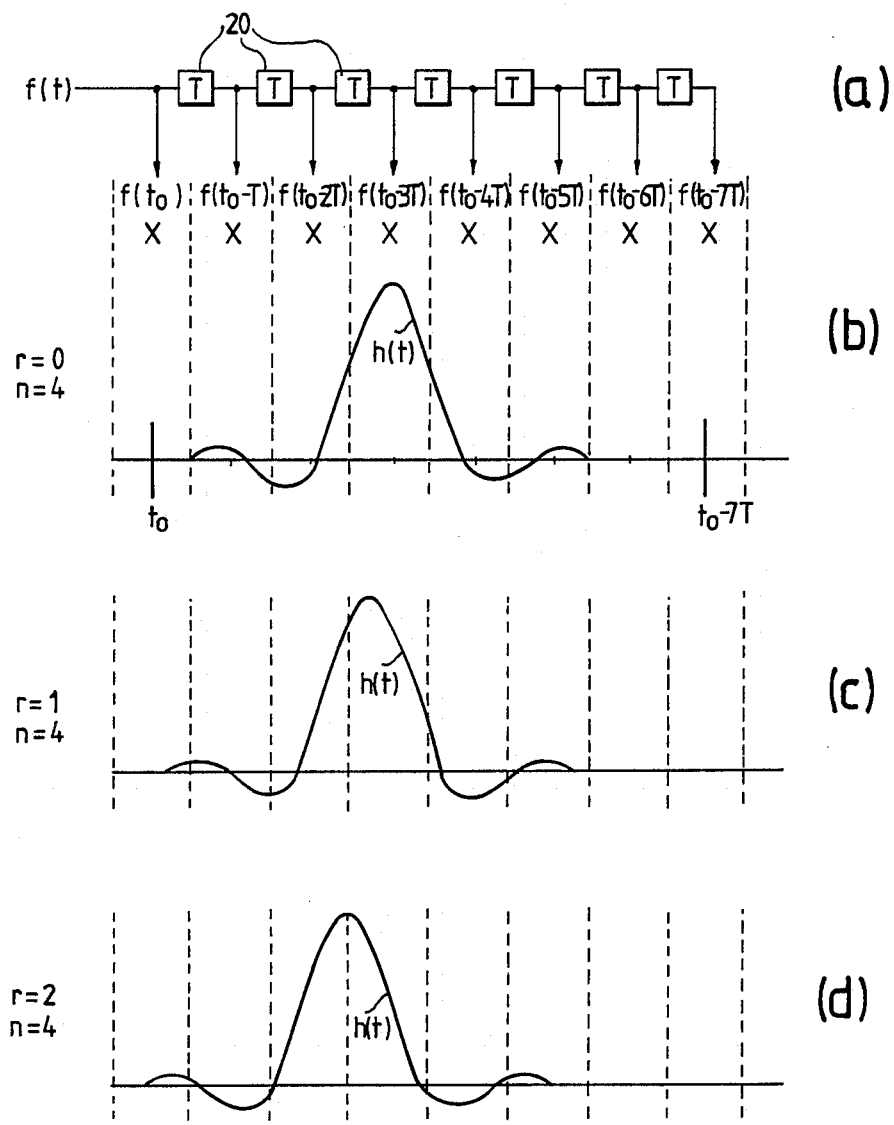
FIG. 11 illustrates, in diagrammatic form, the evaluation, for the FIG. 10 filter, of the convolution integral between the filter input signal and its impulse response.

The output value stored in the ROM for each particular input signal history is pre-evaluated in accordance with the convolution approximation $$g(t) = \sum_{K=0}^{t/T} f(t - KT) \int_{(K - \frac{1}{2})T}^{(K + \frac{1}{2})T} h(\tau) d\tau \qquad (4)$$

which corresponds to Equation (3) given above but with Δτ set to T (: being, as before, the delay variable). This approximation is diagrammatically depicted in FIG. 11 at time t=t₀. In particular, FIG. 11a illustrates that the output of each cell 20 constitutes a respective one of the terms f(t₀-KT) where K is the cell number, while FIG. 11b illustrates the portion of the impulse response whose integral h(τ)dτ is relevant to each f(t₀-KT) term.

Since the filter is required to simulate four different impulse responses, one for each possible data rate $R_2$ of the stream $B_1$ ($R_2$=256 kb/s, 128 kb/s, 64 kb/s, 32 kb/s) the ROM 21 stores four sets of output values, the appropriate set being selected via an output-set select unit 26 controlling address lines $A_{13}$, $A_{14}$ of the ROM 21.

Furthermore, rather than one output value being provided during each period T of the stream $B_1$ which could lead to aliasing problems, the ROM 21 is arranged to output a plurality n of values during each period, each value corresponding to a respective portion of the period T and being determined by the combination of the binary word generated from the delay line during that period and the output of a cyclic counter 27 controlling address lines $A_8$-$A_{12}$ of the ROM 21. As regards the pre-evaluation of the n outputs during any particular period T, clearly while Equation (4) can be used to evaluate one value, since the input signal f(t) does not change during the period T (the delay line only being clocked once each period T), it is necessary to use a modified form of Equation (4) to calculate the remaining (n−1) values, hereinafter termed intermediate values. The modification necessary is to change the limits of the integral of the impulse response so that for the $r^{th}$ intermediate value the impulse response is effectively shifted relative to the input signal history by an amount T r/n. This process is illustrated in FIGS. 11c and d for r=1, 2 and n=4, (FIG. 11b in this case corresponding to r=0). The process is equivalent to evaluating the filter output at time t+rT/n in accordance with the formula:

$$g(t + rT/n) = \sum_{K=0}^{t/T} f(t - KT) \int_{(K - \frac{1}{2} + r/n)T}^{(K + \frac{1}{2} + r/n)T} h(\tau)d\tau \quad (5)$$

In the present filter, the output clocking rate $R_4$ of the filter (and also the clocking rate $R_3$ of the ROM 21) is arranged to be constant at 1024 kb/s (for convenience, hereinafter referred to as 1 MHz). As a result, the value of n will depend on the value of the data rate $R_2$ of the stream $B_1$, n being equal to 4, 8, 16 and 32 for $R_2$=256, 128, 64, and 32 kb/s respectively. To access the differing number of output values relevant to each data rate $R_2$, the counter 27 controlling the ROM address lines $A_8$-$A_{12}$ takes the form of a programmable counter clocked at 1 MHz and set, in dependence on the value of $R_2$, to cyclically alter the addressing data on lines $A_8$-$A_{12}$ in an addressing cycle of period T (the period of the stream $B_1$); this cycle takes in four different codes for $R_2$=256 kb/s, eight different codes for $R_2$=128 kb/s, sixteen codes for $R_2$=64 kb/s, and thirty two codes for $R_2$=32 kb/s.

The number of output values stored in the ROM 21 for $R_2$=256 kb/s is equal to the number (256) of possible values of the 8-bit word derived from the delay line, multiplied by the relevant value of n(4), that is, a total of 1024 values requiring 1K of memory space. Similarly, the memory space required at the data rates 128, 64, and 32 kb/s is 2K, 4K, and 8K giving a total of 15K.

In the FIG. 10 filter, the various clocking signals are derived from the system clock 22 shown within the dashed box. This clock comprises a 1 MHz oscillator 23 and a programmable divider 24 dividing the oscillator output by a factor of 4, 8, 16 or 32 depending on the desired value of the data rate $R_2$ of the stream $B_1$. The delay line made up of the cells 20 is clocked by the output of the divider 24 at the rate $R_2$ while the programmable counter 27 is clocked by the output of the oscillator 23. The clock 22 also controls timing in the de-multiplexer (FIG. 6) and in the circuitry (not shown) used to generate and process the stream B prior to feeding to the modulator; in this manner proper synchronisation throughout the system is assured.

The setting of the programmable divider 24, of the programmable counter 27, and of the output-set select unit 26 is controlled by a data-rate select input 25 in dependence on the desired data rate.

In operation of the filter, the filter is first set up for a particular data rate value $R_2$. Thus, for example, if $R_2$ is to be 256 kb/s, the divider 24 is set to divide-by-four, the counter 27 is arranged to cyclically count to four, and the unit 26 is set to select, via lines $A_{13}$, $A_{14}$, the set of output values appropriate to the rate $R_2$. Upon each new bit of the stream $B_1$ being clocked into the delay line, the ROM 21 outputs, in dependence on the value of the binary word derived from the delay line, a first value which is held for a quarter of the stream period T, this value corresponding to an evaluation in accordance with Equation (4) above. As the output of the counter 27 changes for the second quarter of the current period T, a first intermediate value is output, this value having been evaluated in accordance with Equation (5) for r=1, n=4. Further clocking of the counter 27 results in the third and fourth quarter outputs being produced at the ROM output. Thereafter, the delay line is clocked again and the process is repeated.

For different data rates $R_2$, the filter operates in a similar manner but with differing numbers of intermediate values being output during each period of the stream $B_1$.

The output of the ROM 21 is fed to a digital-to-analog converter 30 (FIG. 6) before being passed to the multiplier 12. A latch (not shown) clocked at the addressing rate $R_3$ of the ROM 21 may be provided between the output of the ROM 21 and the D/A converter 30.

Figure 12:
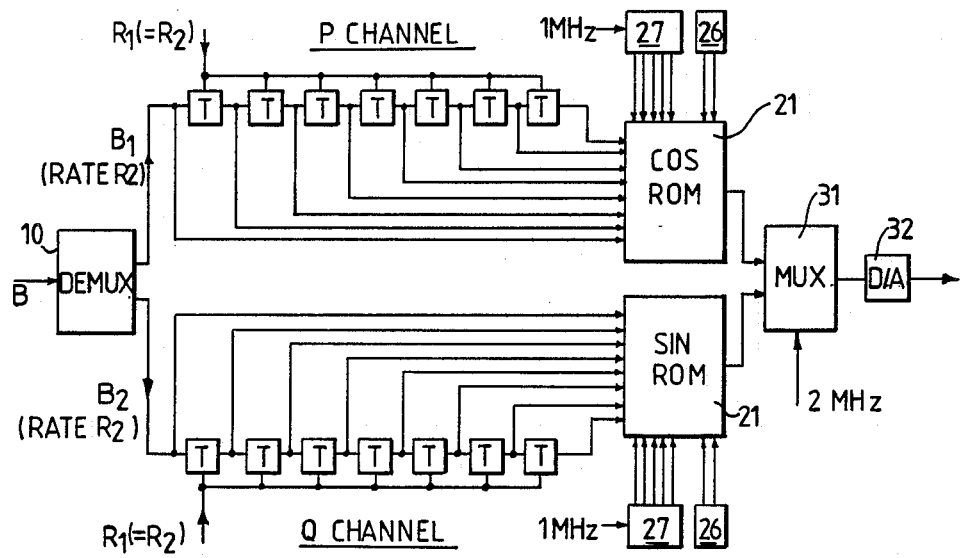
FIG. 12 is a block diagram of a data modem modulator block.

A variant of the FIG. 6 modulator block is shown in FIG. 12. In this variant, the actual modulation process is effected by pre-weighting the filter output values stored in the P and Q channel digital-filter ROMs 21 by sample values of respective cos and sin carrier waveforms. Apart from the weighting of the filter output values stored in the ROMs 21, the digital filters 11 of the FIG. 12 variant are identical in form and operation to that shown in FIG. 10 with the delay lines of the filters being clocked at the data rate $R_2$ of the incoming binary sub-stream $B_1$ or $B_2$ and their ROMs being clocked at 1 MHz. The outputs of the ROMs 21 are combined by a multiplexer 31 which is clocked at 2 MHz and serves the same function as the analog summer 16 of FIG. 6. A digital-to-analog converter 32 is connected to the output of the multiplexer 31.

Figure 13:
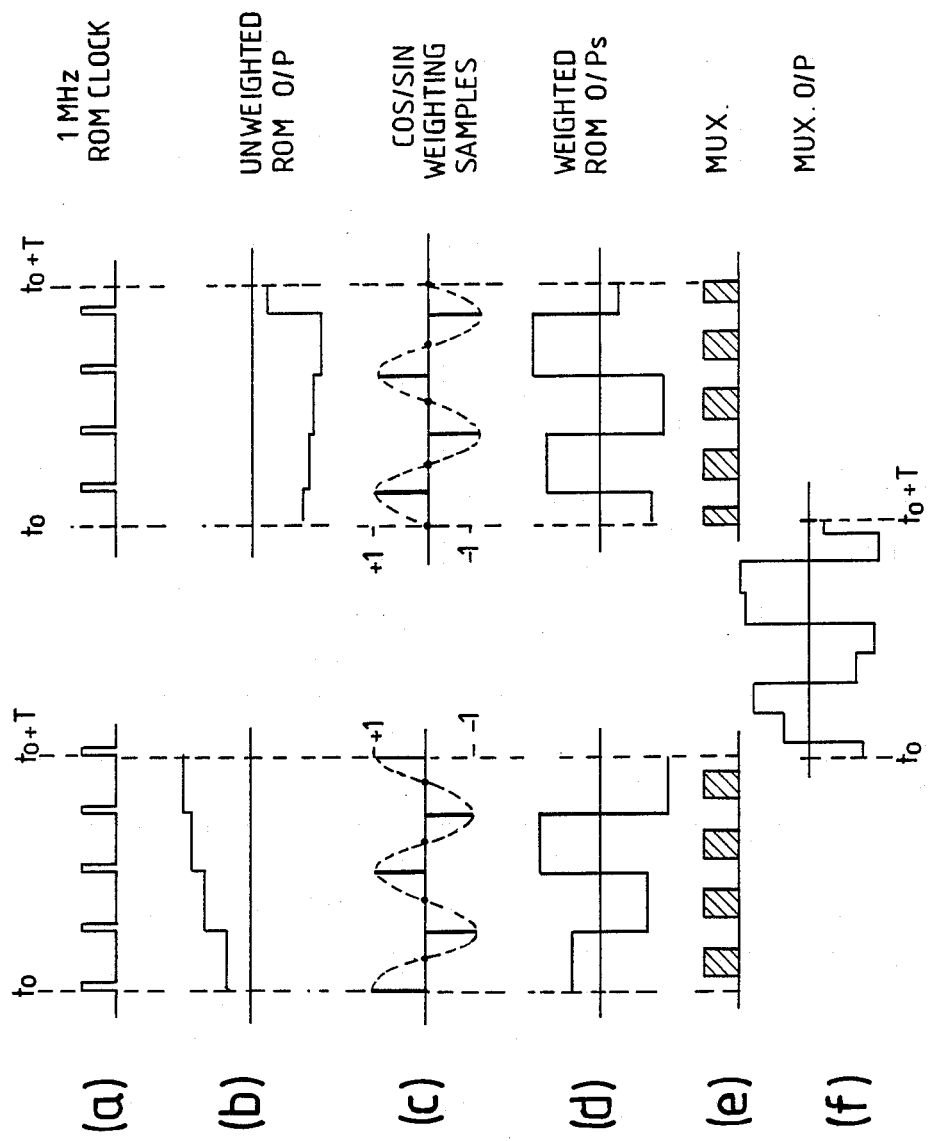
FIG. 13 shows waveforms illustrating the operation of the apparatus of FIG. 12.

FIG. 13 illustrates the modulation process effected by the FIG. 12 arrangement for the case where the data rate $R_2$ of the streams $B_1$, $B_2$ is 256 kb/S, each ROM 21 outputting in this situation four values during each period T of the streams $B_1$, $B_2$.

As can be seen from FIG. 13a, which shows the ROM clocking waveforms, the clocking of the Q-channel ROM 21 is effected in anti-phase to that of the P-channel ROM.

In the case of the FIG. 6 modulator where the ROMs of the digital filters 11 are not weighted by cos and sin sample values, the P and Q channel ROM outputs might, for example, vary over a period $t_o$ to $t_o+T$ in the manner illustrated in FIG. 13b (it being understood that the ROM outputs are in binary code rather than in the form of the equivalent analog levels that are shown in the FIG. 13b, this also being the case for FIGS. 13d and f).

The values stored in the P and Q Channel ROMs 21 are respectively weighted by sample values of a cos and a sin waveform of ½ MHz frequency. FIG. 13c shows such waveforms in dashed lines together with four sample values per cycle, equi-spaced at angles of $\pi/2$ starting at to, these sample values being $+1, 0, -1, 0$ for the cos waveform and $0, +1, 0$, and $-1$ for the sin waveform. The use of four sample values per cycle of the ½ MHz cos and sin waveforms does, of course, correspond to eight sample values per period T which is double the number of output values actually stored by the ROMs for each period. This apparent discrepancy is due to the fact that it is not necessary to store output values corresponding to the zero sample values for the reasons explained below.

The sample values occur at 2 MHz and, as can be seen, are so mutually arranged as between the P and Q channels that at any one time the weighting provided by the latest sample in one channel will be zero while the weighting provided by the latest sample in the other channel will be $\pm 1$. Since, therefore, after weighting, only one channel will at any one time provide a contribution to the modulator output, it is possible to combine the channel signal by use of the multiplexer 31 clocked at 2 MHz. Furthermore, this use of a multiplexer means that the value of the channel output not selected by the multiplexer at a particular moment can be of any value and does not need to be zero. It is therefore unnecessary for the ROMs 21 to store zero-weighted output values but only values weighted by the $\pm 1$ samples; each ROM value is then output for two clock periods of the multiplexer 31 during only one of which is that output value used by the multiplexer. FIG. 13d shows the ROM outputs of FIG. 13b after weighting by the $\pm 1$ sample values of FIG. 13c, while FIG. 13e shows by hatched areas the periods for which each channel ROM is selected by the multiplexer 31. The multiplexer output is shown in FIG. 13f. It will be noted that the multiplexer is arranged to change between selected channels intermediate transitions in the channel outputs.

The output signal of the digital-to-analog converter 32 is fed to a frequency up converter (not shown, but which may be of any suitable form) to translate the output signal to the same carrier frequency $\omega_c$ as in the case of the FIG. 6 modulator.

The output of the modulator (whether of the FIG. 6 or FIG. 12 form) is then subjected to further frequency up conversion for transmission via a satellite link.

Figure 14:
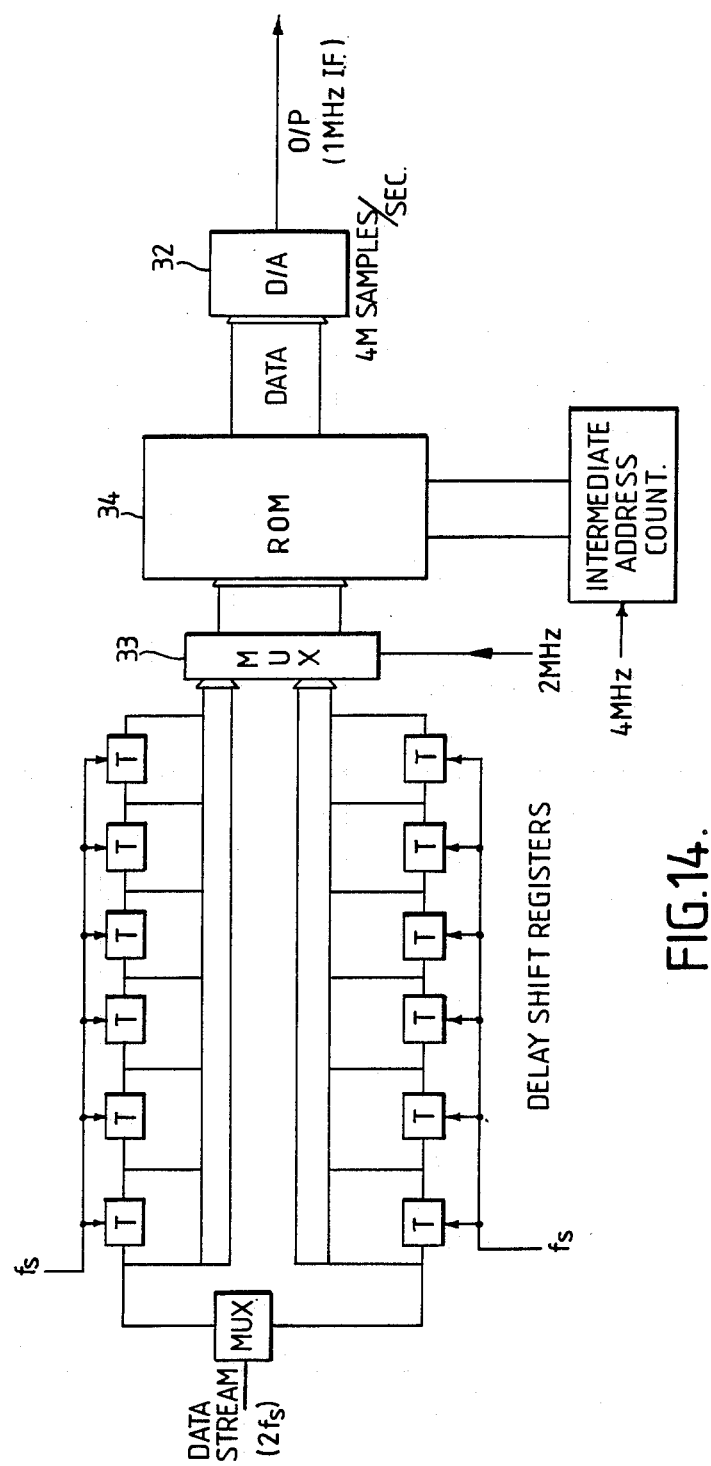
FIG. 14 is a block diagram of a modified version of the modulator block of FIG. 12.
Figure 15:
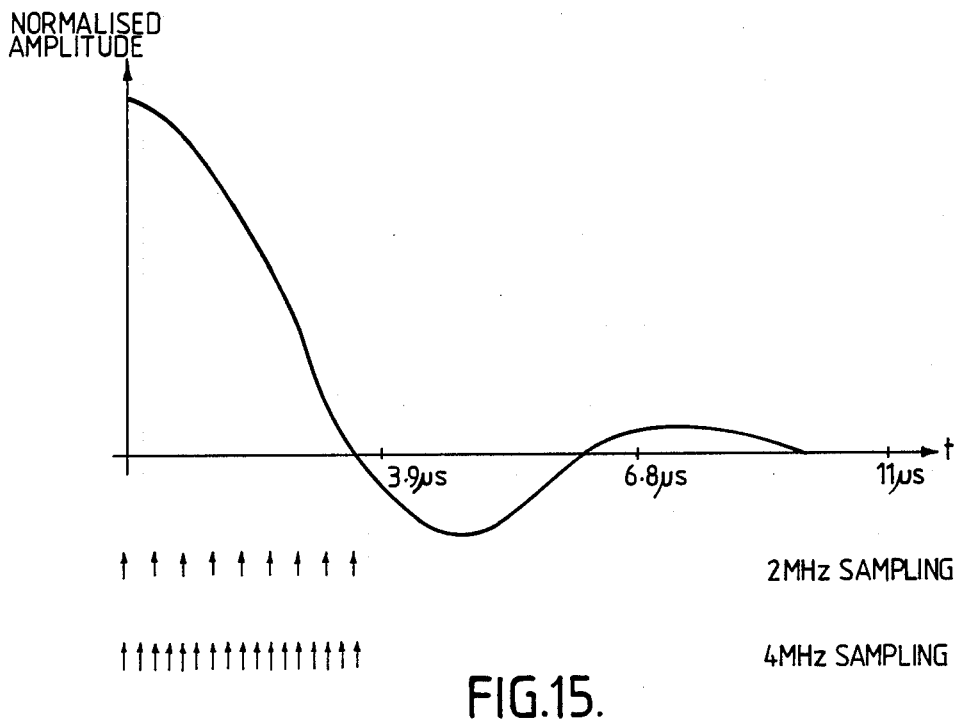
FIG. 15 is an impulse response curve of a filter having a $\sqrt{30\%}$ raised cosine frequency response characteristic for a data rate of 256 kb/s.

Referring to FIG. 14, a further variant of the modulator block dispenses with the separate ROMs 21 of the FIG. 12 variant by multiplexing the outputs of the P and Q channel delay shift registers in a multiplexer 33 and feeding the multiplexed 'signal history' inputs to the address lines of a single ROM 34, the data outputs of the ROM 34 being coupled directly to the D/A converter 32. This simplified variant cannot be used at such high data rates as the variant of FIG. 12 and is typically useful for data rates of less than 512 symbols/sec. The intermediate sample values are accessed as before, and, referring to FIG. 15, if the output rate from the ROM 34 is at a 4 MHz rate with transmitted signal on a 1 MHz carrier, then the impulse response used for each channel is sampled at 2 MHz as shown, the output being zero on alternate samples in each channel. In fact, the convolution in each channel is carried out by sampling the impulse response at 4 MHz but accessing alternate samples for the P and Q channels, for example the P-channel accessing on even addresses and the Q-channel on odd addresses. The modulation of a carrier is carried out as before by multiplying the intermediate sample pairs by $+1$ and $-1$ alternately.

Figure 16:
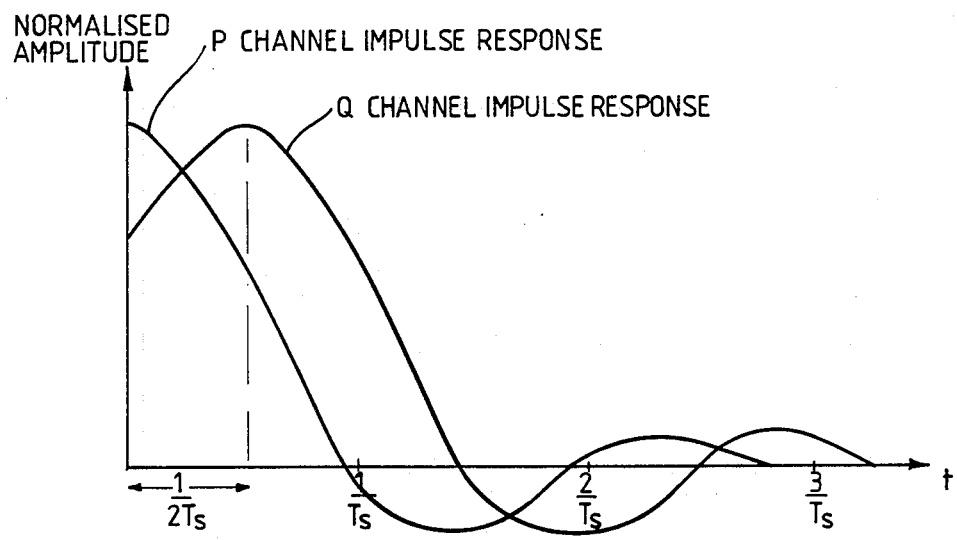
FIG. 16 is a pair of impulse response curves delayed with respect to each other.

Offset QPSK modulation is sometimes used to reduce envelope variations in a transmitted signal, and this can be performed in the modulation blocks of FIG. 12 or FIG. 14 in a relatively simple manner by delaying the Q-channel data stream by one half a symbol period such that the P-channel data changes in the center of the Q-channel symbol period and vice versa. To do this a ½ symbol period time delay can be added into the clocking of one of the sets of delay registers. Alternatively, the relevant ROM or ROM portion can be arranged to store the data corresponding to the convolution of a delayed impulse response as shown in FIG. 16. Here the normal P-channel impulse response is interleaved with a delayed Q-channel response. In this way, the modulation format can be changed on a software level simply by altering the content of the ROM. The possibility of additional out of band components can be avoided if necessary by increasing the delay register length with a consequent increase in memory space. This same technique could be used to implement various other forms of offset keying where the delay is not necessarily half a symbol period but could be ⅛, ¼, ⅜, etc.

Figure 17:
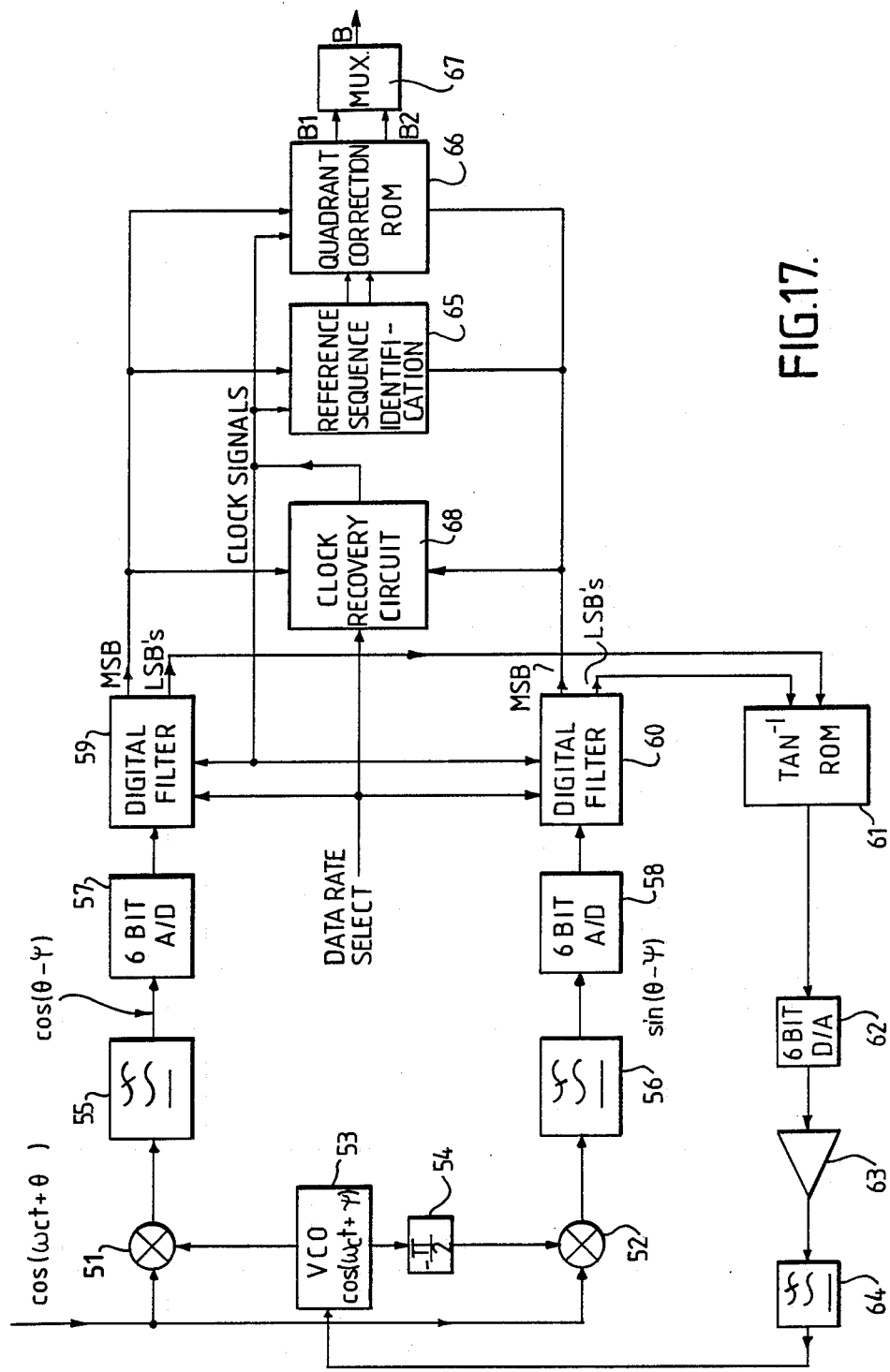
FIG. 17 is a block diagram of a data-modem demodulator block including digital filters embodying the present invention.

FIG. 17 illustrates the demodulator block of the data modem. The input to the demodulator is of the form cos $(\omega_c t + \theta)$ and is derived from a frequency down converter stage (not shown) which includes a 500 KHz bandpass filter (for example, a SAW filter) centered on $\omega_c$.

The input signal cos $(\omega_c t + \theta)$ is fed to two mixers 51, 52.

In the mixer 51, the input signal is mixed with a signal output from a voltage controlled oscillator 53 that forms part of a phase locked loop; for convenience of description the oscillator output will, for the moment, be taken to be cos $\omega_c t$, that is, of the same frequency and phase as the output of the modulator oscillator 13 (though as will be more fully explained hereinafter, the demodulator oscillator output is, in practice, of the form cos $(\omega_c t + \Psi)$ where $\Psi$ can be 0, $\pi/2$, $\pi$, or $3\pi/2$). The output of the mixer 51 is fed to a low pass-filter 55 to produce a signal of the form sin $\theta$.

In the mixer 52, the input signal (cos$\omega_c t + \theta$) is mixed with a signal sin $\omega_c t$ derived from the oscillator 53 via a $-\pi/2$ phase shift circuit 54. The output of the mixer 52 is passed to a low-pass filter 56 to produce a signal of the form cos $\theta$.

The outputs of the filters 55, 56 are next converted into 6 bit binary words in analog-to-digital converters 57, 58 which operate at a sampling rate of 1 MHz, that is, at twice the maximum frequency allowed through the bandpass filter of the demodulation down converter. The conversion effected in the converters 57, 58 takes the form illustrated in FIG. 18 from which it can be seen that the most significant bit (MSB) of the converter output effectively acts as a sign bit.

The outputs of the A/D converters 57, 58 are then fed to digital filters 59, 60 which are matched to those of the modulator and effect a 30% raised cosine spectral shaping. The filters 59, 60 will be described in detail hereinafter. The output of each filter 59, 60 is, again, a 6-bit binary word.

The values of the outputs of the filters 59, 60 at the midpoint of each transmitted symbol period, represents the values $\cos\theta$ and $\sin\theta$ where $$\theta = \frac{\pi}{4}, \frac{3\pi}{4}, \frac{3\pi}{4} \text{ and } \frac{7\pi}{4}$$

depending on the values of the two substream bits being sent (see FIG. 7). The effect of the spectral shaping effected by the digital filters in the modulator and demodulator is to cause $\theta$ to progressively vary between its mid-symbol values. However, to facilitate explanation of the demodulation process, the values of $\cos\theta$, $\sin\theta$ and $\theta$ referred to below will be the midpoint values.

Figures 18, 19:
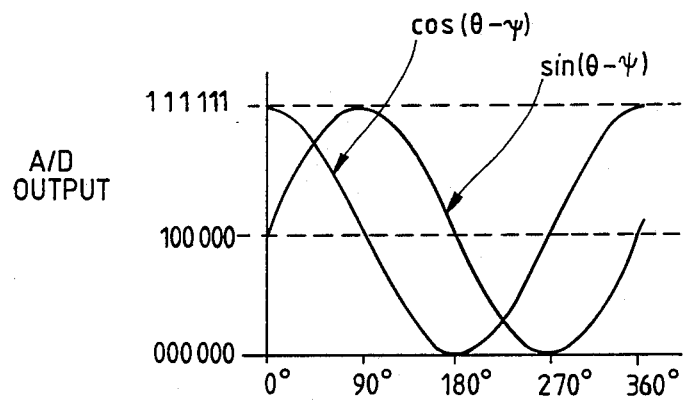
FIG. 18 is a graph illustrating the relationship between the input and output of an analog-to-digital converter forming part of the FIG. 17 demodulator.
FIG. 19 is a table inter-relating the values of the most significant output bits of the digital filter included in the FIG. 17 demodulator with the sub-stream bit values represented thereby.

In order to derive the value of $\theta$ and thus determine the value of the two substream bits being transmitted during each symbol period, it is necessary to use both the $\cos\theta$ and $\sin\theta$ signals provided by the filters 59, 60 since these signals are not normalised. In fact, the determination of the value of $\theta$ can be effected by determining the angle quadrant in which $\theta$ lies; this latter is readily derived from the signs of the $\cos\theta$ and $\sin\theta$ signals, that is, from the MSBs of the filter outputs. Thus, for example, if the MSBs of both filter outputs are "1', then $\theta$ lies in the first angle quadrant which from FIG. 7 means that the P and Q channel bits ($B_1$ and $B_2$ streams) are also both 1. The Table shown in FIG. 19 gives the values of the $B_1$, $B_2$ substream bits for the various combination of filter output MSB values, the relevant portion of the Table being the row designated $\Psi = 0°$.

The least significant bits (LSBs) of the outputs of the filters 59, 60 represent the in-quadrant value of $\theta$ which should, of course, be $\pi/4$ whatever the absolute value of 8 (that is, whatever the value of the two substream bits being transmitted during the current symbol period).

In the foregoing discussion of the general operation of the demodulator, it has been assumed that the output of the oscillator 53 is $\cos\omega_c t$. The frequency and phase of the oscillator 53 are, in practice, established by a phase-locked loop that operates by feeding back to the voltage-controlled oscillator 53 a signal indicative of any phase error between the actual value of $\theta$ decoded from the output signals of the filters 59, 60 and the value that $\theta$ should have if the oscillator output had the desired frequency and phase. Now, while the absolute value of $\theta$ varies between symbols, the in-quadrant value of $\theta$ should, as explained above, be constant at $\pi/4$ so that the frequency and phase of the oscillator can be controlled by the in-quadrant value of $\theta$ at the output of the filters 59, 60. This in-quadrant value of $\theta$ is determined by feeding the LSB's of the digital filter outputs to a $\tan^{-1}$ decoding ROM 61 (this ROM is designed to give an output representative of an angle X when fed with sinX and cosX inputs, whatever the value of X may be). The phase-locked loop controlling the oscillator 53 is then completed by feeding the output of the ROM 61 through a digital-to-analog converter 62, an amplifier 63, and a low-pass filter 64 back to the oscillator 53. The parameters of the units 61 to 64 are such that the oscillator locks up at a phase giving an in-quadrant value of $\theta$ of $\pi/4$.

In fact, since only the in-quadrant value of $\theta$ is used as the feedback signal in the phase-locked loop, the oscillator can lock up at any one of four phases, that is with an output of $\cos(\omega_c t + \Psi)$ where $\Psi$ may be 0, $\pi/2$, $\pi$, or $3\pi/2$. The effect of the oscillator locking up in a state other than $\Psi = 0$ is that the relationship between the MSBs (sign bits) of the digital filter outputs and the actual values of the transmitted substream bits is no longer as set out in row $\Psi = 0$ of the FIG. 19 Table. However, provided the value of $\Psi$ can be determined, then the substream bit values can still be readily determined from the MSBs of the digital filter output and the FIG. 19 Table shows the required conversions for the four possible values of $\Psi$.

The determination of the value of $\Psi$ at which the oscillator 53 has locked up can be achieved by the transmission of a predetermined unique reference bit sequence. This sequence will produce one of four possible sequences of MSB values at the output of the digital filters 59, 60 depending on the value of $\Psi$. By comparing the actual MSB sequence with each possible sequence the value of $\Psi$ can be determined. In the FIG. 14 demodulator, this process is effected in a reference sequence identification unit 65; a fuller description of such a unit is given in International Application No. W084/01874 the disclosure of which is incorporated herein by reference. The unit 65 is arranged to output a two-bit code identifying the value of $\Psi$. This code is fed to a quadrant correction ROM 66 together with the MSBs of the digital filters 59, 60. The ROM 66 holds a look-up table corresponding to that of FIG. 19 and the output of the ROM represents the two bits of the substream $B_1$, $B_2$ for the current period signal. These two output bits are combined in a multiplexer 67 to reconstitute the stream B.

As already indicated, the proper operation of the demodulator requires the recovery of a symbol timing information from the incoming signal (the rate of symbol transmission, and therefore receipt, being that of the substreams $B_1$, $B_2$ that is, the rate $R_2$). This clock recovery process is effected in a clock recovery circuit 68 one possible form of which is shown in FIG. 20 (it being appreciated that any other suitable form of clock recovery circuit may alternatively be used).

Figure 20:
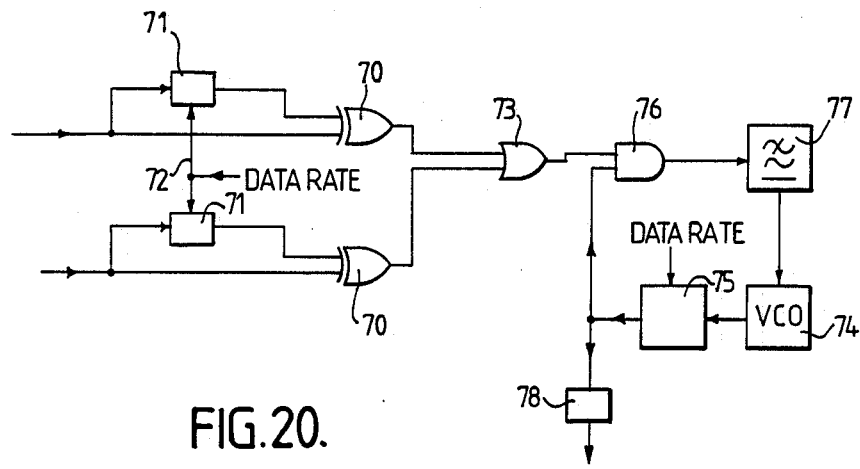
FIG. 20 is a block diagram of a clock recovery circuit of the FIG. 17 demodulator.

The clock recovery circuit of FIG. 20 is fed with the MSBs output by the digital filters 59, 60. One or both of these MSB's will change in value between successive symbol periods provided that there is a change in the data being transmitted between these periods. These changes in the MSBs are used to define the transition times in the recovered symbol clock in the manner described below.

Each MSB is fed to an exclusive-OR gate 70 both directly and via a delay 71 equal to half the symbol rate period T (the demodulator is preset to receive at a particular data rate and the delays 71 are set up by a signal on line 72 to this rate). The outputs of the exclusive −OR gates 70 are pulses of duration T/2. These pulse outputs are added in an OR gate 73 and used to generate an error signal for driving a phase-locked loop. This loop comprises a voltage-controlled oscillator 74 a programmable divider 75 controlled via the data-rate set line to divide the oscillator output down to the current data rate, an AND gate 76 combining the output of the gate 73 and divider 75 to produce the loop error signal, and a low-pass filter 77. This arrangement provides a clock output at the symbol rate $R_2$, this output being maintained during any temporary absence of transitions in the MSB's output from the digital filters 59, 60. A phase correction circuit 78 may be provided to introduce a predetermined phase correction into the clock recovery circuit output to ensure that the demodulator evaluates the incoming signal at the optimum time during each symbol period.

The output of the clock recovery circuit is used to control clocking of the digital filters 59, 60, the reference sequence identification unit 65, the ROMs 66 and 61. A secondary output (not shown) from the programmable divider 75 is used to provide a signal at twice the rate $R_2$ for clocking the multiplexer 67.

The form and manner of operation of the digital filter 59 will now be described with reference to FIGS. 18 and 19, the digital filter 60 being identical in all respects to the filter 59.

The primary purpose of the digital filter 59 is to effect the same spectral shaping as that carried out by the digital filters in the modulator, that is, in the present example, a $\sqrt{30\%}$ raised cosine spectral shaping. In an ideal environment, this could be simply done by sampling the output of the filter 55 at an integer multiple of the set data rate (for example, at four times this rate) and then clocking the samples at the sampling rate into a transversal filter programmed with the desired impulse response. Not only would this arrangement avoid problems with signal aliases (as the sampling frequency would be at least twice the data rate) but it would also mean that the transversal filter could be identical for all four data rates (due to the clocking rate of the filter being data-rate related).

In reality, the fact that the bandpass filter of the modulator down converter has a fixed 500 kHz bandwidth, means that while the above filter arrangement is satisfactory, for 256 kb/s (assuming a sampling rate of 1 MHz), at lower data rates any proportionate reduction in the effective sampling rate (that is, in the actual sampling rate or in the rate at which the samples are clocked into the filter) will result in the noise let through the down-converter bandpass filter being aliased back into the signal. To overcome this problem, a variable bandwidth low-pass transversal filter stage is placed in front of the main spectral-shaping filter and is used to reduce the signal bandwidth for the three lower data rates thereby enabling the sample rate for these data rates to be reduced to four times the data rate. This low-pass filter stage must, of course, deal with samples at the 1 MHz sampling rate (this being the sampling rate of the A/D converter 57) to avoid aliasing problems even though its sample output rate need only be four times the set data rate. Since in practice the response of the low-pass filter stage will not be flat, the spectral shaping effected by the main filter stage will need to be modified from $\sqrt{30\%}$ raised cosine to give this overall shaping to the filter 59. It should be noted that for the highest data rate (256 kb/s), the output of the A/D converter 57 is fed direct to the main filter stage as the sampling rate is already at four times the data rate.

The variable-bandwidth low-pass filter stage is shown in FIG. 21 and comprises a digital delay line composed of thirty one interconnected 6-bit shift register cells 80, the input of the first cell being connected via a FIFO (first in, first out) store 81 to the output of the A/D converter 57. For ease of explanation, the presence of the FIFO 81 will initially be ignored and the clocking rate of the delay-line cells 80 will be taken to be an even 1 MHz (that is, the sampling rate of the A/D converter 57.

The input to the first cell 80 and the output of all the cells 80 are connected via 6-bit wide lines to the input of a 32-way multiplexer 82. This multiplexer 82 is controlled by a programmable counter 83 one count cycle of which takes the multiplexer 82 (and also the filter stage as a whole) through one cycle of operation. Disregarding the presence of the FIFO 81, the count cycle of the counter 83 has a duration equal to the clocking interval of the delay line, that is 1μs. The number of counts in a count cycle is dependent on the selected data rate and during each cycle of separation the multiplexer $B_2$ is arranged to cyclically switch a corresponding number of its input lines through to a ROM 84 to provide address codes therefor. The ROM 84 is also addressed by the output of the counter 83 and by the data rate select line 72 (in practice this line takes the form of two binary signal lines). The output of the ROM 84 is connected to a summer 85 which serves to sum all the ROM outputs produced during a cycle of operation of the multiplexer 82, the resultant sum being then fed to a latch 86 where it is held for the duration of the next multiplexer cycle.

During each cycle of operation, the low-pass filter stage takes, in turn, each delay-line tap value of relevance and determines, with regard to the particular signal-history period represented thereby, the magnitude of the component of the filter output resulting therefrom. This determination is effected by using each digital tap value as an address code to look up in the ROM 84 the output component magnitude appropriate to that value for the signal-history period defined by the current count value of the counter 83, this latter count value also being used as part of the total ROM address. The filter output is then computed by summing all the output components corresponding to the top values of relevance.

The actual number of tap points of relevance is greater the lower the data rate selected since the cut-off frequency of the low-pass filter stage is designed to reduce in proportion with the data rate and the resultant extension in the time width of the impulse response cannot be compensated for by reducing the delay-line clocking rate (for the reasons already discussed). It is to deal with this increase in tap points of relevance at the lower data rates that the count cycle of the counter 83 (and thus the number of tap points accessed by the multiplexer 82) must be set according to the data rate. Similarly, it is not possible to use only a single set of stored output-component values in the ROM 84 but a separate set must be stored for each data rate, the appropriate set being selected via the line 72.

Thus, for the data rate of 128 kb/s where it is desired to halve the signal bandwidth from 500 to 250 kHz, the filter is designed to have an impulse response as shown in the uppermost graph of FIG. 21 corresponding to a slow roll-off low-pass filter; since this impulse response has a duration of 8μs, the counter 83 is set to cycle through a count of nine to cause the multiplexer 82 to feed in turn to the ROM 84, the input to the first cell 80 and then the output of each of the first eight cells 80. This cycle takes 1 μs and the resultant nine ROM output values are summed in summer 85 to produce a filter output sample value After each count cycle is complete, the delay line is clocked to bring in a new value into the first cell and shift the other values down the line; thereafter the filter cycle repeats. Now, if every output value so produced was actually output by the filter, this would, of course, result in a sample output rate of 1 MHz, however, as already noted, it is possible and desired to reduce the output rate to four times the data rate. This is done for the 128 kb/s data rate by only clocking into the latch 86 every other final sum value produced by the summer 85, the output rate of the filter then being 512 K samples/second as desired.

For the 64 kb/s data rate, the low-pass filter is designed to reduce the signal bandwidth by a factor of four; the corresponding impulse response has a duration of 16 μs so that the counter 83 is set to cycle through a count of seventeen in 1 μs. In other respects, the filter operates in a manner analogous to that described above except that only one in four summer outputs are latched into the latch 86 giving a filter output rate of 256 k samples/second (that is, 4 x data rate).

For the 32 kb/s data rate, the filter impulse response has a duration for 32 μs and the counter 83 is set to cycle through a count of thirty two (the last 1 μs of the impulse response is, in fact, ignored). Only one in every eight samples is output giving an output data rate of 128 k sample/second.

The total storage capacity required for the ROM 84 is equal to $2^6 \times (9+17+32)$ 6-bit values, the factor of $2^6$ being the number of possible values of each digital tap signal.

It will be appreciated that operation of the FIG. 21 filter in the above-described manner is highly inefficient due to the processing time spent calculating output values that are then discarded; ideally, this processing time would be redeployed to ease the task of calculating the values actually output from the filter. The FIFO 81 in fact serves this purpose in the manner now to be described.

The FIFO 81 is arranged to receive the samples output by the A/D converter 57 at an even 1 MHz. Since none of these filter input samples can be discarded without risking aliasing problems, the output clocking rate of the FIFO 81 must also average 1 MHz; however, the samples are not clocked evenly from the FIFO. Considering the 128 kb/s data rate setting where only half the possible filter output values are required, the FIFO 81 is arranged to rapidly output two samples to the delay line and then wait 2μs. During this 2 μs, the multiplexer executes one operating cycle on the current state of the delay line and one output value is determined in the summer 85 and latched into the latch 86; the counter 83 thus now has a 2 μs cycle time. At the end of each 2 μs period, another pair of input samples is successively clocked from the FIFO 81 into the delay line and a new output value then determined during the next 2 μs period. The possible output values corresponding to the delay line state that briefly exists following clocking in of the first sample of each pair are not calculated so that the output rate of the filter is half its input rate. In a similar manner, for the 64 kb/s data rate setting where only one in four of the possible output values are required, the input samples are clocked into the delay line in fours at 4 μs intervals. Each 4 μs interval is used to calculate one output sample and the counter 83 has a 4 μs cycle time.

Again, for the 32 kb/s data rate setting, the input samples are clocked into the delay line in eights at 8 μs intervals, each 8 μs interval being used to calculate one filter output sample. In this case, the cycle time of the counter 83 is 8 μs.

Figure 22:
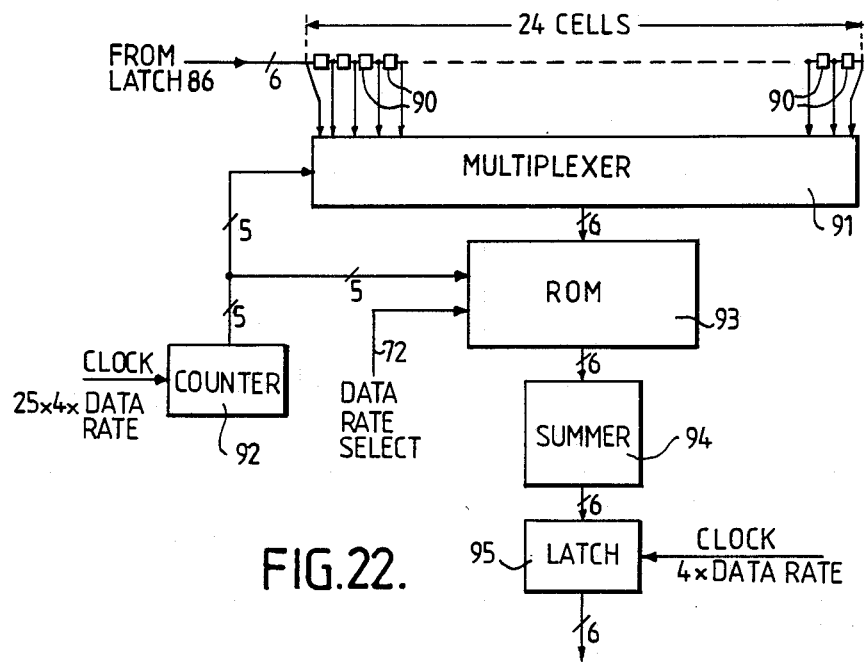

The main spectral-shaping stage of the digital filter 59 is shown in FIG. 22. As explained above, this stage is arranged to receive 6-bit samples at four times the selected data rate whatever that rate may be. The form of the FIG. 22 spectral-shaping filter stage is similar to that of low-pass filter stage of FIG. 21, except that the FIFO is omitted and the whole delay line is used at all data rates. More particularly, the FIG. 22 filter stage comprises a delay line made up of 6-bit cells 90 into which the input samples are clocked at four times the data rate; a multiplexer 91 arranged, between each clocking of the delay line, to access in turn the input to the first cell 90 and the output of all the cells 90, the operation of the multiplexer 91 being controlled by a cyclic counter 92; a ROM 93 storing components of the filter output, the ROM 93 being addressed by the outputs of the multiplexer 91 and the counter 92; a summer 94 for summing the set of output components supplied by the ROM 93 between each clocking of the delay line; and an output latch 95 arranged to hold each sum value output by the summer for the subsequent clocking period.

The impulse response emulated by the FIG. 22 filter stage is that shown in FIG. 9 (that is, $\sqrt{30\%}$ raised cosine response). As can be seen from FIG. 9, this impulse response has a significant duration of approximately 24 μs at a data rate of 256 kb/s. For this latter data rate, the clocking of the FIG. 22 delay line is required to be at 1 μs intervals (4 x data rate) so that twenty four cells 90 are required to cover the significant width of the impulse response. For the three lower data rates, the increased time width of the desired impulse response is counter-acted by the slower clocking rate of the delay cells so that, again, only twenty four cells 90 are required. To appropriately control the scanning of these twenty four cells 90 by the multiplexer 91, the counter 92 is arranged to effect a count cycle of twenty five within a period equal to four times the data rate.

If the response of the low-pass filter stage were ideal, then a single set of output components stored in the ROM 93 could be used for all four data rates. However, in practice, it will be necessary to compensate for variations in the response of the low-pass filter between data rates by providing a separate, compensated, output sample set in ROM 93 for each of the four possible data rates. Selection of the appropriate output-component set is achieved by feeding the line 72 to the ROM to provide further addressing information.

The output of the latch 95 constitutes the output of the digital filter 59, the samples appearing at the filter output being subsequently processed in the manner already described to derive the P and Q channel substreams $B_1$, $B_2$ from which the original stream B is finally reconstituted.

Figure 23:
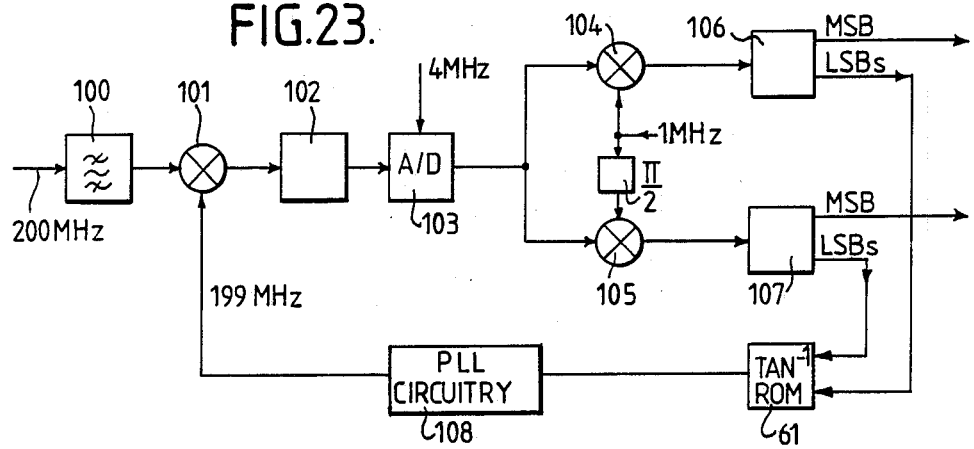
FIG. 23 is a block diagram showing an alternative arrangement for part of the FIG. 17 demodulator block.

FIG. 23 shows an alternative arrangement for the FIG. 17 demodulator block this alternative arrangement employing digital demodulation techniques. In the specific example illustrated in FIG. 23, a 200 MHz input signal is band limited in a SAW filter 100 before being down-converted to 1 MHz, this latter process being effected by mixing the 200 MHz signal with a 199 MHz signal in a mixer 101 and then filtering the mixer output in a filter 102. The filter 102 is centered on 1 MHz and has a bandwidth of 2 MHz.

The output of the filter 102 is sampled and digitised in an A/D converter 103 at a 4 MHz rate (that is, at the Nyquist frequency. The digital signal stream output by the converter 103 is mixed in digital mixers 104, 105 with quadrature 1 MHz digital waveforms before being passed to digital filters 106, 107 that correspond to the filters 59 and 60 of the FIG. 17 demodulator. The outputs of the filters 106, 107 are processed in substantially the same manner as the corresponding filter outputs in FIG. 17, the MSBs being used to recover the original data streams $B_1$, $B_2$ while the LSBs are fed to a $Tan^{-1}$ ROM61 to derive an inquadrant phase angle signal for use as a phase-locked-loop (PLL) feedback signal However, whereas in the FIG. 17 demodulator this feedback signal controls the phase of the quadrature signals fed to the cos and sin channel mixers 51 and 52, in the FIG. 23 arrangement the feedback signal produced by the ROM 61 is fed to PLL circuitry 108 to control the 199 MHz supplied to the mixer 101. In standard manner, the circuitry 108 includes a voltage controlled oscillator and loop filter (not shown).

Figure 24:
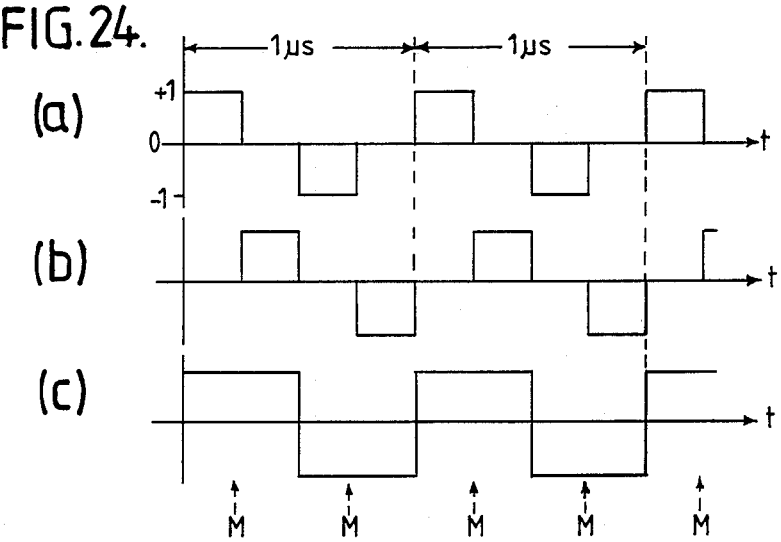
FIG. 24 depicts sample weightings produced by digital cos and sin waveforms used in the demodulator arrangements of FIGS. 23 and 25.

The 1 MHz signals fed to the mixers 104 and 105 are digital simulations of cos and sin signals and weight the samples output from the A/D converter 103 by the amounts indicated in FIGS. 24A and 24B respectively. Thus, the cos signal fed to the mixer 104 provides sample weightings of $+1, 0, -1, 0$, for the four samples occupying each cycle of the 1 MHz signal (see FIG. 24A); similarly, the sin signal fed to the mixer 105 provides weightings of $0, +1, 0, -1$ in each cycle. It will be appreciated that these weightings are implemented digitally, for example, by sign bit inversion and inhibit operations.

Figure 25:
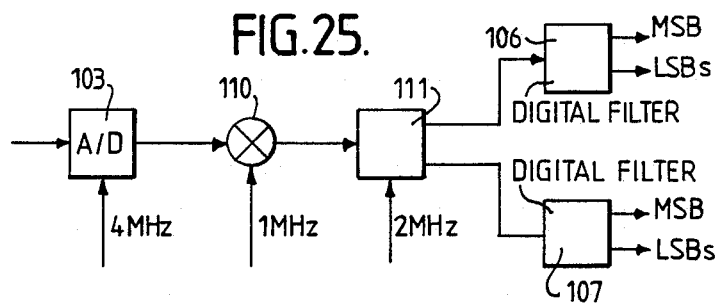
FIG. 25 is a block diagram of a modified version of the FIG. 23 arrangement.

FIG. 25 shows a modified version of part of the FIG. 28 arrangement where the digital mixers 104 and 105 are replaced by a single digital mixer 110 followed by a demultiplexer 111. The mixer 110 is fed with a 1 MHz signal that weights alternate pairs of samples output from the converter 103 by $+1$ and $-1$ as depicted in FIG. 24C. The demultiplexer 111 that follows the mixer 110 is clocked at 2 MHz at points in time indicated M in FIG. 24C whereby to achieve the same effective sample weighting of the inputs to the filters 106 and 107 as in FIG. 23.

The signals used to drive the A/D converter 103 and the mixers 104, 105 or the mixer 110 and demultiplexer 111 are all derived from a common clock circuit.

Figure 26:
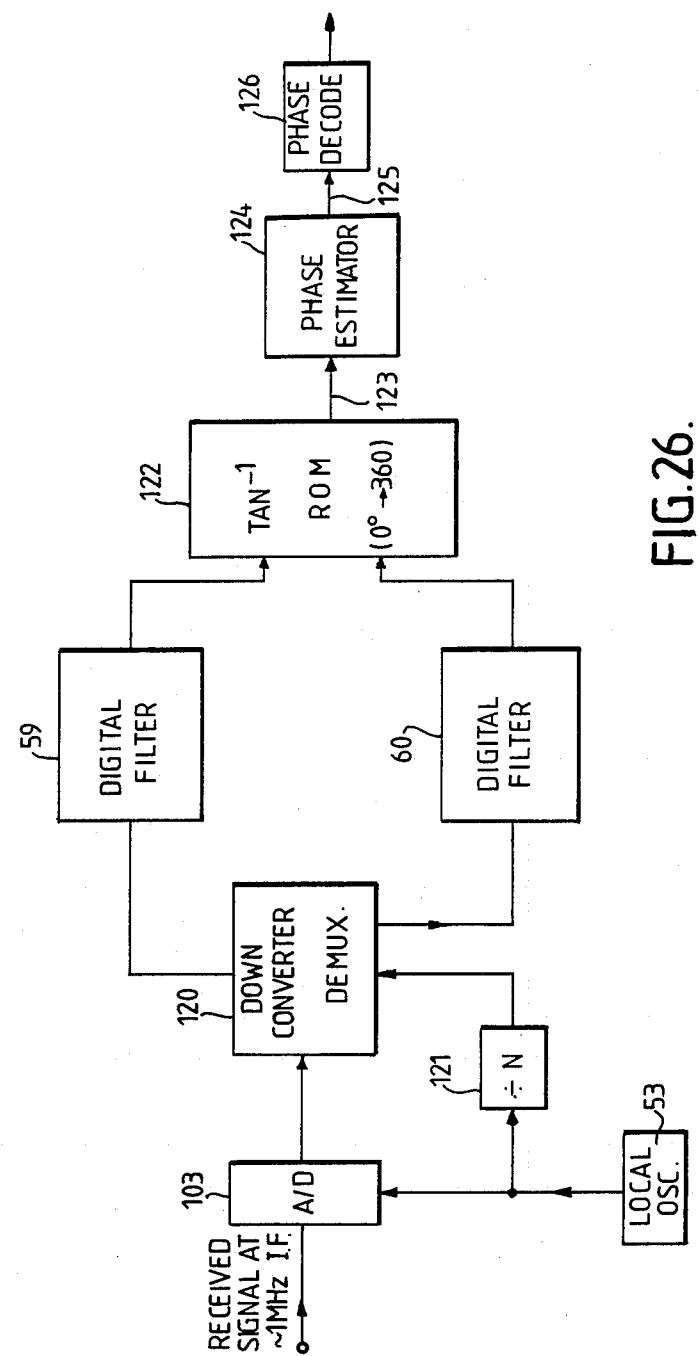
FIG. 26 is a bock diagram of a second demodulator block in accordance with the invention.
Figure 27:
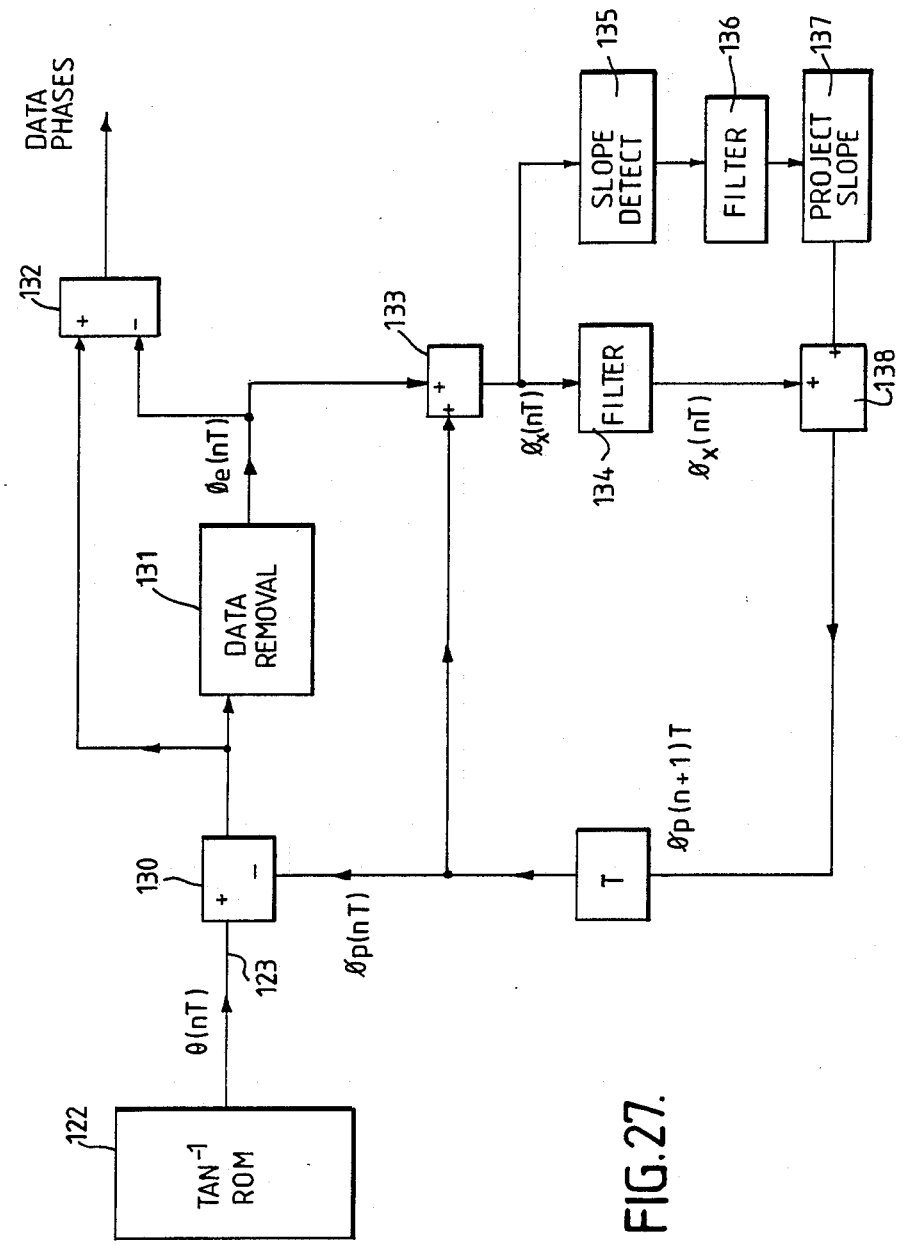
FIG. 27 is a block diagram showing part of the demodulator block of FIG. 26 in more detail.

Referring now to FIGs. 26 and 27, a further demodulator embodiment dispenses with the phase-locked loop of the embodiments of FIGS. 17, 23 and 25. Phase-locked loops have certain disadvantageous behavioural characteristics such as the time to lock on to a signal, the pull-in frequency range, and the tracking range. To obtain an improvement in one of the characteristics, e.g. lock-on time, requires sacrificing performance in one or both of the other characteristics. It has been proposed in the past to overcome these problems by employing digital circuits carrying out complex mathematical calculations to obtain carrier recovery. The embodiment of FIGS. 26 and 27 allows the phase and frequency of the demodulated signal to drift and then compensates for the drift without the need for complex mathematical operations, bringing advantages over the phase locked loop technique in terms of an improved frequency range and a very short signal acquisition time.

In this embodiment, the local oscillator 53 is free running and arranged to be near in frequency to the incoming carrier or intermediate frequency (I.F.) signal frequency. A primary constraint is that its frequency should be a multiple of the recovered symbol rate. It should also be relatively stable. If the incoming signal is a pure carrier, the down converted signal in each quadrature channel will be a sine wave at a frequency equal to the frequency difference between the local oscillator frequency and the incoming signal frequency. In the present example, the down conversion is carried out digitally by first converting the incoming signal to digital form in A/D converter 103 clocked at, for example, 4 MHz by the local oscillator 53, and then down converting and multiplexing into cos and sin (P and Q) components in a digital circuit 120 also clocked by the local oscillator 53 together with a divider 121. The whole of the filtered output from each digital filter 59, 60 is then fed to a decoding ROM 122 containing $tan^{-1}$ information extending over 360° at the same difference frequency, i.e. the difference between the frequency obtained from the divider 121 and the incoming frequency. This produces a demodulatored output on line 123 representing a constantly rotating phase or, the rotation being due to the free-running local oscillator. The addition of data to the incoming signal results in instantaneous phase jumps from the rotating phasor so as to represent the transmitted data. It is this combined rotating phasor and data signal that is processed by a phase estimating circuit 124 which compensates for the phase and frequency differences resulting from the use of a free running local oscillator and yields an output on line 125 having four possible constant phase angles (in the case of QPSK modulation) as required. This output is then processed in known manner by phase decoder 126 giving the wanted data output.

Referring to FIG. 27, the phase estimating circuit 124 typically comprises a subtraction stage 130 to remove the phase error due to the frequency difference referred to above, which is then coupled to a stage 131 for removing the phase jumps due to data. Clearly the difference between the input and output of this stage 131 represents the wanted data which is available at the output of a second subtraction stage 132. The other input of the first subtraction stage 130 is coupled to processing circuitry coupled to the output of the data removal stage 131. Thus, the latter output feeds a loop including an adder 133 coupled to an averaging filter 134 which is in parallel with also detecting and projecting circuit comprising a sample difference calculator 135, filter 136 and multiplier 137. The filter 134 and the multiplier 137 are coupled to respective inputs of a second adder 138 having an output coupled back to the second input of the first adder 133 via a delay stage 139. The signal produced by the loop represents an estimate of the overall error in the phase signal produced at the output of the demodulating ROM 122, so that when subtracted from the phase signal in subtraction stage 130, it yields the wanted phase coded data plus some residual phase error.

The operation of the phase estimator circuit of FIG. 27 is as follows. The signal produced on line 123 (the output of the demodulating ROM 122) comprises a series of 8-bit digital samples of the phase $\theta(nT)$ of the received signal. This phase comprises, in the general case, the phase information representing the wanted data superimposed on the rotating phase $0_x(nT)$ which can be represented by a straight line or sawtooth phase/time graph. In subtractor stage 130 the estimate (i.e. the predicted phase) $0_p(nT)$ of the rotating phasor is subtracted from $\theta(nT)$ to yield the wanted phase information plus the residual phase error $0_e(nT)$ (including noise). The phase information is removed in stage 131 by multiplying the signal by 4 mod 360° for QPSK, or 2 mod 360° for BPSK, which leaves just the residual phase error $0_e(nT)$. Subtraction by stage 132 of the residual phase error from the initial phase error plus phase information signal allows the data to be extracted by phase decoder 126 (FIG. 26). The phase information is in the form of phase angles 0°, 90°, 180°, or 270° for QPSK and 0° or 180° for BPSK. Returning to the phase estimation, adder 133 adds the predicted phase $0_p(nT)$ to he residual phase error $0_e(nT)$ to obtain the actual phase $\theta(nT)$ minus the phase information, i.e. $0_x(nT)$. Filtering (filter 134) produces a mean value of phase over a given period of time dependent on the impulse response of the filter. Simultaneously, the value $0_x(nT)$ is entered into slope detector 135 which, in combination with filter 136, produces a mean value for the slope of $0_x(nT)$ over a period of time. This value, effectively representing the frequency error in the incoming carrier, is then multiplied and projected in PROM multiplier 137 so that it can be added (in adder 138) to the mean phase value $0_x(nT)$ obtained by filter 134 to produce a value for the phase of the next incoming sample. An appropriate delay is added so that this predicted value $0_p((n=1)T)$ can be subtracted from that next sample in subtractor stage 130.

We claim:

1. A data modem system having a transmitter unit and a receiver unit for transmitting and receiving digital information represented by a binary modulation signal having a predetermined symbol rate, wherein at least one of the units includes an intermediate frequency stage operable at a frequency which is an integral multiple of the modulation symbol rate, and wherein each unit which includes the intermediate frequency stage includes filtering and conversion means for simultaneously filtering he modulation signal and converting between digital representations of a modulated carrier signal and of quadrature components of the modulation signal, the filtering and conversion means comprising digital filter means for filtering the modulation signal and frequency converter means for weighting digital signal samples passing through the filtering and conversion means alternately by $+1$ and $-1$ and for periodically inhibiting the said samples.

2. A data modem system according to claim 1, wherein the frequency converter means is arranged to process a digital signal representing an analog signal, and is coupled to means for converting between said digital and said analog signals.

3. A data modem system according to claim 1, characterised in that the integral multiple is 2, 4 or 8.

4. Apparatus for receiving an information carrying modulated data signal having a predetermined modulation symbol rate, wherein the apparatus comprises:
means for converting the said signal to a digital signal representative of an analog modulated carrier signal having a carrier frequency which is an integral multiple of the symbol rate, the digital signal comprising a stream of samples generated at a rate which is an integral multiple of the carrier frequency;
digital splitting means for splitting the carrier signal into quadrature components by subjecting the samples to the combination of alternate weighting by $+1$ and $-1$ and a periodic inhibiting operation thereby to generate digital quadrature component representations each having a weighting sequence $+1, 0 -1, 0, \ldots$, the sequence in one component being displaced with respect to the sequence in the other component; and
digital filter means coupled to an output of the digital splitting means and arranged to produce a plurality of digital sample values representative of said information.

5. Apparatus according to claim 4, wherein the splitting means forms part of a demodulator including a digital circuit for down-converting a signal representative of the modulated carrier signal, a local oscillator means for generating an output signal at a frequency which is a multiple of the symbol rate, and said circuit having a local oscillator input for receiving said output signal.

6. Apparatus according to claim 5, wherein the local oscillator input is coupled to a free-running local oscillator, and wherein the apparatus includes a phase correction stage coupled to the output of the digital filter means.

7. Apparatus according to claim 6, wherein the phase correction stage includes a subtractor device coupled to the output of the digital filter means for subtracting from a first phase signal obtained at said output a second phase signal representing an approximation of the first phase signal less variations due to the information content to produce a corrected phase signal.

8. Apparatus according to claim 4 further comprising means for performing an inverse tangent calculating on at least portions of pairs of the said sample values to derive a phase angle signal.

9. A method according to claim 4, wherein the integral multiple relating the carrier frequency to the symbol rate is 2 or 4.

10. A method of receiving and demodulating an information carrying modulated data signal having a predetermined modulation symbol rate, including the steps of converting the said signal to a digital signal representative of an analog modulated carrier signal having a carrier frequency which is an integral multiple of the symbol rate, the digital signal comprising a stream of samples generated at a rate which is an integral multiple of the carrier frequency, digitally splitting the carrier signal into quadrature components by subjecting the samples to the combination of alternate weighting by $+1$ and $-1$ and a periodic inhibiting operation thereby to generate digital quadrature component representations each having a weighting sequence $+1, 0, -1, 0, \ldots$, the sequence in one component being displaced with respect to the sequence in the other component, and digitally filtering the said components to produce a plurality of digital sample values representative of said information.

11. A method according to claim 10, characterised in that an inverse tangent calculation is performed on at least portions of pairs of the said sample values to derive a phase angle signal.

12. A method according to claim 11, characterised in the phase angle signal is fed into a phase locked loop for controlling a local oscillator used in the converting step.

13. A method according to claim 10, including digitally frequency down-converting and splitting the said digital signal by said weighting and said inhibiting operation by feeding the signal to the combination of a digital mixer and a digital demultiplexer, a local oscillator signal of a frequency which is a multiple of the symbol rate being fed to the demultiplexer.

14. A method according to claim 13, wherein the local oscillator signal is derived from a free-running oscillator, and wherein said digital sample values serve as the input for a phase correction circuit.

15. A method according to claim 14, wherein the digital sample values constitute a first phase signal representing the actual phase of the modulated data signal which includes phase error, and wherein the method further includes substantially removing the phase error in a feed forward compensation manner involving subtracting from the first phase signal a second phase signal representing an approximation of the actual phase less phase variations due to the information, thereby to produce a corrected phase signal.

16. A method according to claim 15, wherein the corrected phase signal includes a residual phase error, and wherein the second phase signal is generated by removing information phase components from the corrected phase signal, to produce a residual phase error signal, adding the second phase signal to the residual phase error signal to produce a third phase signal representing the actual phase of the first phase signal, evaluating the third phase signal over a period of time to predict a subsequent value of the third phase signal, and using the predicted value for generating said second phase signal.

17. A method according to claim 15, wherein the removal of said phase variations due to the information in generating the second phase signal comprises the step of multiplying by 2 or 4.

18. A method according to claim 10, wherein the integral multiple relating the carrier frequency to the symbol rate is 2 or 4.

19. A method of receiving an information carrying modulated signal, including the steps of down-converting the modulated signal using a free-running local oscillator, demodulating the converted signal to produce a first phase signal representing the actual phase of the converted modulated signal which includes a phase error, and substantially removing the phase error in a feed forward compensation manner from the first phase signal by substantially removing phase variations due to said information whereby said second phase signal represents an approximation of the actual phase less the phase variations due to the information, and subtracting the second phase signal from the first phase signal to remove said phase error.

20. A method according to claim 19, wherein the signal resulting from said subtraction includes information phase components and a residual phase error, and wherein the second phase signal is generated by removing the information phase components from the signal resulting from said subtraction to produce a residual phase error signal, adding the second phase signal to the residual phase error signal to produce a third phase signal representing the actual phase of the first phase signal, evaluating the third phase signal over a period of time to predict a subsequent value of the third phase signal, and using the predicted value for generating the said second phase signal.

21. A method according to claim 20, further comprising the step of removing the information phase components by multiplication by 2 or 4.

22. A method of receiving an information carrying phase-modulated signal having a predetermined symbol rate, wherein the method includes the steps of down-converting the signal to a carrier frequency which is an integral multiple of the symbol rate using a free-running local oscillator signal, subjecting a digital representation of the down-converted signal to a further frequency conversion by means of a weighting operation in which digital sample values of the signal are weighted according to the repeating coefficient sequence $+1, 0, -1, 0, \ldots$, digitally filtering and demodulating the resulting weighted samples to yield a phase signal in the form of phase angle values of the received signal, which phase signal includes a phase angle information component and a phase angle error component, supplying the phase angle components to a phase estimator for separating the information component from the error component, and decoding the information component to obtain the information.

23. A method according to claim 22, wherein the weighting operation comprises the step of generating a series of weighted samples representing a pair of quadrature baseband components of the modulated signal.

24. A method according to claim 23, wherein said weighting operation includes the step of digitally demultiplexing said digital sample values.

25. A method according to claim 24, wherein said weighting operation includes a digital mixing operation step in which said digital sample values are alternately weighted by $+1$ and $-1$, and wherein said digital demultiplexing comprises the step of periodically inhibiting the alternately weighted samples to produce two steams of weighted samples each having said repeating coefficient sequence $+1, 0, -1, 0, \ldots$, and each representing a respective one of said quadrature components, the sequence of one component being displaced by one weighting interval with respect to the sequence of the other components.

26. A method according to claim 23, wherein said demodulation step to yield said phase signal comprises the step of performing an inverse tangent using a read-only memory.

27. A method according to claim 22, further comprising the steps of removing the error component from the phase signal in a feedforward compensation manner by substantially removing the information component and averaging to generate a second phase signal representing an approximation of the error component, and subtracting the second phase signal from the phase signal obtained from said filtering and demodulation to remove the phase error components.

28. A method according to claim 27, wherein the signal obtained by said subtraction includes the information component and a residual phase error component, and wherein the second phase signal is generated by removing the information component from the signal obtained by said subtraction step to produce a residual phase error signal, adding the second phase signal to the residual phase error signal to produce a third phase signal representing the phase of the phase signal obtained from said filtering and demodulation, evaluating the third phase signal over a period of time to predict a subsequent value of the third phase signal, and using the predicted value for generating the second phase signal.

29. A method according to claim 27, further comprising the step of removing the information component, substantially, by multiplication by 2 or 4.

30. A method according to claim 22, wherein the integral multiple relating the carrier frequency to the symbol rate is 2 or 4.

31. A satellite communications link including a data modem system having a transmitter unit and a receiver unit for transmitting and receiving digital information represented by a binary modulation signal having a predetermine symbol rate, wherein sat least one of the units includes an intermediate frequency stage operable at a frequency which is an integral multiple of the modulation symbol rate, and wherein each unit which includes the intermediate frequency stage includes filtering and conversion means for simultaneously filtering the modulation signal and converting between digital representations of a modulated carrier signal and of quadrature components of the modulation signal, the filtering and conversion means comprising digital filter means for filtering the modulation signal and frequency converter means for weighting digital signal samples passing through the filtering and conversion means alternately by $+1$ and $-1$ and for periodically inhibiting the said samples.

* * * * *